(12) United States Patent
Park et al.

(10) Patent No.: US 11,889,462 B2
(45) Date of Patent: Jan. 30, 2024

(54) SYSTEMS AND METHODS FOR BI-STATIC RADIO-BASED OBJECT LOCATION DETECTION

(71) Applicant: QUALCOMM Incorporated, San Diego, CA (US)

(72) Inventors: Sungwoo Park, Seoul (KR); Wooseok Nam, San Diego, CA (US); Tao Luo, San Diego, CA (US); Junyi Li, Fairless Hills, PA (US); Juan Montojo, San Diego, CA (US); Jing Sun, San Diego, CA (US); Xiaoxia Zhang, San Diego, CA (US); John Edward Smee, San Diego, CA (US); Peter Gaal, San Diego, CA (US); Taesang Yoo, San Diego, CA (US); Simone Merlin, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 290 days.

(21) Appl. No.: 17/335,761

(22) Filed: Jun. 1, 2021

(65) Prior Publication Data

US 2021/0385784 A1 Dec. 9, 2021

Related U.S. Application Data

(60) Provisional application No. 63/035,091, filed on Jun. 5, 2020.

(51) Int. Cl.
*H04W 64/00* (2009.01)
*G01S 13/48* (2006.01)
(Continued)

(52) U.S. Cl.
CPC ............ *H04W 64/006* (2013.01); *G01S 3/46* (2013.01); *G01S 13/003* (2013.01); *G01S 13/48* (2013.01); *H04W 24/10* (2013.01)

(58) Field of Classification Search
CPC ... H04W 64/00; H04W 64/006; H04W 24/10; G01S 3/46; G01S 13/003; G01S 13/42;
(Continued)

(56) References Cited

U.S. PATENT DOCUMENTS 5,852,630 A * 12/1998 Langberg ............ H04L 27/2647
375/219
2019/0170869 A1 6/2019 Kravets et al.
(Continued)

FOREIGN PATENT DOCUMENTS

KR 101733033 5/2017
WO WO 2018166626 9/2018

OTHER PUBLICATIONS

WO/2021/140010 A1 (Year: 2021).*
(Continued)

*Primary Examiner* — Siu M Lee
(74) *Attorney, Agent, or Firm* — Weaver Austin Villeneuve & Sampson LLP

(57) ABSTRACT

Bi-static radio-based object location detection can include determining, by a wireless device, a location of a remote wireless device; obtaining a ToF and an angle of arrival (AoA) of a reflected WWAN reference signal reflected by a remote object; and determining a location of the remote object based on the location of the remote wireless device, the ToF, and the AoA. In another example, a wireless device includes a wireless transceiver; a non-transitory computer-readable medium; and a processor communicatively coupled to the wireless transceiver and non-transitory computer-readable medium, the processor configured to determine a
(Continued)

location of a remote wireless device; obtain a ToF and an angle of arrival (AoA) of a reflected WWAN reference signal reflected by a remote object; and determine a location of the remote object based on the location of the remote wireless device, the ToF, and the AoA.

26 Claims, 10 Drawing Sheets

(51) Int. Cl.
*H04W 24/10* (2009.01)
*G01S 3/46* (2006.01)
*G01S 13/00* (2006.01)

(58) Field of Classification Search
CPC .......... G01S 13/46; G01S 13/48; G01S 13/86; G01S 2013/462; G01S 7/006
See application file for complete search history.

(56) References Cited

U.S. PATENT DOCUMENTS

| | | |
|---|---|---|
| 2020/0064456 A1 | 2/2020 | Xu et al. |
| 2021/0181332 A1* | 6/2021 | Yun .......................... G01S 7/025 |
| 2022/0206136 A1* | 6/2022 | Subasic ................... G01S 13/91 |
| 2022/0357419 A1* | 11/2022 | Givehchian ........... H04W 4/029 |

OTHER PUBLICATIONS

WO/2018/160141 A1 (Year: 2018).*
International Search Report and Written Opinion—PCT/US2021/035520—ISA/EPO—dated Sep. 23, 2021.

* cited by examiner

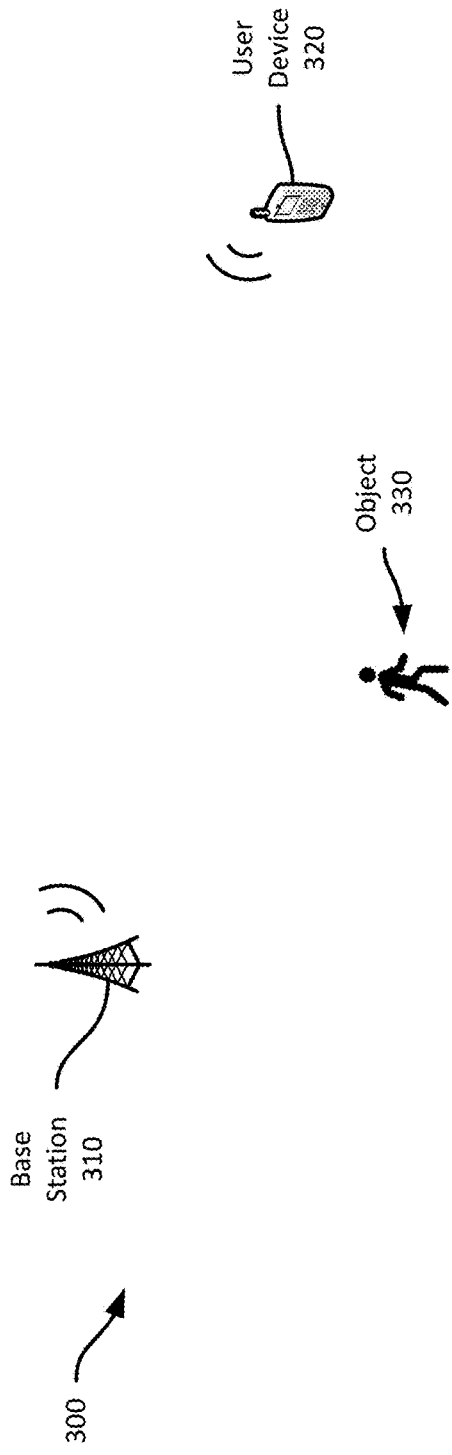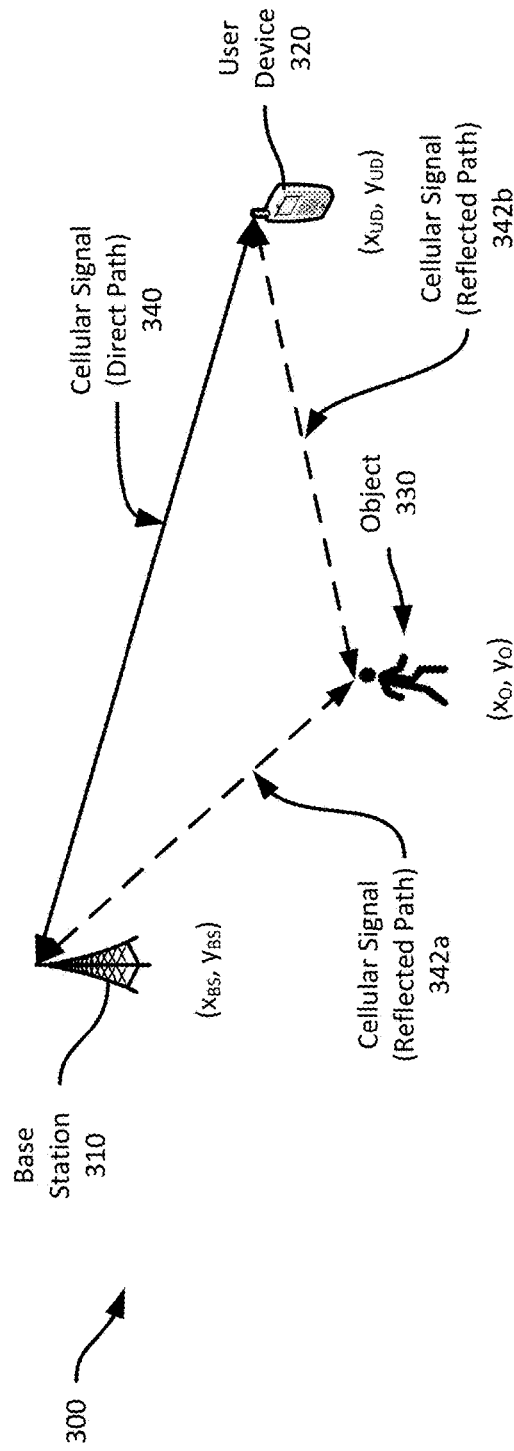

600

Obtain, at a first wireless device, a location of a second wireless device
610

Obtain, at the first wireless device, a ToF and an AoA of a wireless WWAN reference signal transmitted by a transmitting device, wherein TOF and AoA are obtained from measurements of the WWAN reference signal at a receiving device after the WWAN reference signal is reflected by an object
620

Determine, with the first wireless device, a location of the object based on the location of the second wireless device, the ToF, and the AoA;
wherein:
- the first device comprises the transmitting device and the second device comprises the receiving device, or
- the first device comprises the receiving device and the second device comprises the transmitting device

SYSTEMS AND METHODS FOR BI-STATIC RADIO-BASED OBJECT LOCATION DETECTION

RELATED APPLICATIONS

This application claims the benefit of U.S. Provisional Application No. 63/035,091, filed Jun. 5, 2020, entitled "SYSTEMS AND METHODS FOR BI-STATIC RADIO-BASED OBJECT LOCATION DETECTION", which is assigned to the assignee hereof, and incorporated herein in its entirety by reference.

BACKGROUND

Detecting objects at a distance from a location can be performed using radar or LIDAR to transmit a signal into an environment and detect the signal reflected the distant object. By calculating the amount of time between transmitting the signal and receiving the reflection, the distance to the object can be determined.

BRIEF SUMMARY

Various examples are described for systems and methods for bi-static radio-based object location detection. One example method includes determining, by a wireless device, a location of a remote wireless device; obtaining a time-of-flight ("ToF") and an angle of arrival ("AoA") of a reflected wireless wide-area network ("WWAN") reference signal reflected by a remote object; and determining a location of the remote object based on the location of the remote wireless device, the ToF, and the AoA.

Another example method for bi-static radio-based object location detection, according to this disclosure, comprises obtaining, at a first wireless device, a location of a second wireless device. The method also comprises obtaining, at the first wireless device, a time-of-flight (ToF) and an angle of arrival (AoA) of a wireless wide-area network (WWAN) reference signal transmitted by a transmitting device, wherein TOF and AoA are obtained from measurements of the WWAN reference signal at a receiving device after the WWAN reference signal is reflected by an object. The method also comprises determining, with the first wireless device, a location of the object based on the location of the second wireless device, the ToF, and the AoA; wherein the first wireless device comprises the transmitting device and the second wireless device comprises the receiving device, or the first wireless device comprises the receiving device and the second wireless device comprises the transmitting device.

An example first wireless device for bi-static radio-based object location detection, according to this disclosure, comprises a transceiver, a memory, one or more processors communicatively coupled with the transceiver and the memory, wherein the one or more processors are configured to obtain a location of a second wireless device. The one or more processing units are further configured to obtain a time-of-flight (ToF) and an angle of arrival (AoA) of a wireless wide-area network (WWAN) reference signal transmitted by a transmitting device, wherein TOF and AoA are obtained from measurements of the WWAN reference signal at a receiving device after the WWAN reference signal is reflected by an object. The one or more processing units are further configured to determine a location of the object based on the location of the second wireless device, the ToF, and the AoA, wherein: the first wireless device comprises the transmitting device and the second wireless device comprises the receiving device, or the first wireless device comprises the receiving device and the second wireless device comprises the transmitting device.

An example apparatus for bi-static radio-based object location detection, according to this disclosure, comprises means for obtaining a location of a wireless device. The apparatus further comprises means for obtaining a time-of-flight (ToF) and an angle of arrival (AoA) of a wireless wide-area network (WWAN) reference signal transmitted by a transmitting device, wherein TOF and AoA are obtained from measurements of the WWAN reference signal at a receiving device after the WWAN reference signal is reflected by an object. The apparatus further comprises means for determining a location of the object based on the location of the wireless device, the ToF, and the AoA, wherein: the apparatus comprises the transmitting device and the wireless device comprises the receiving device, or the apparatus comprises the receiving device and the wireless device comprises the transmitting device.

According to this disclosure, an example non-transitory computer-readable medium stores instructions for bi-static radio-based object location detection, the instructions comprising code for obtaining, at a first wireless device, a location of a second wireless device. The instructions further comprise code for obtaining, at the first wireless device, a time-of-flight (ToF) and an angle of arrival (AoA) of a wireless wide-area network (WWAN) reference signal transmitted by a transmitting device, wherein TOF and AoA are obtained from measurements of the WWAN reference signal at a receiving device after the WWAN reference signal is reflected by an object. The instructions further comprise code for determining, with the first wireless device, a location of the object based on the location of the second wireless device, the ToF, and the AoA, wherein: the first wireless device comprises the transmitting device and the second wireless device comprises the receiving device, or the first wireless device comprises the receiving device and the second wireless device comprises the transmitting device.

These illustrative examples are mentioned not to limit or define the scope of this disclosure, but rather to provide examples to aid understanding thereof illustrative examples are discussed in the Detailed Description, which provides further description. Advantages offered by various examples may be further understood by examining this specification.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

FIGS. 3A-3B show an example system for bi-static radio-based object location detection;

FIGS. 6-8 show example methods for bi-static radio-based object location detection;

DETAILED DESCRIPTION

Figure 1:
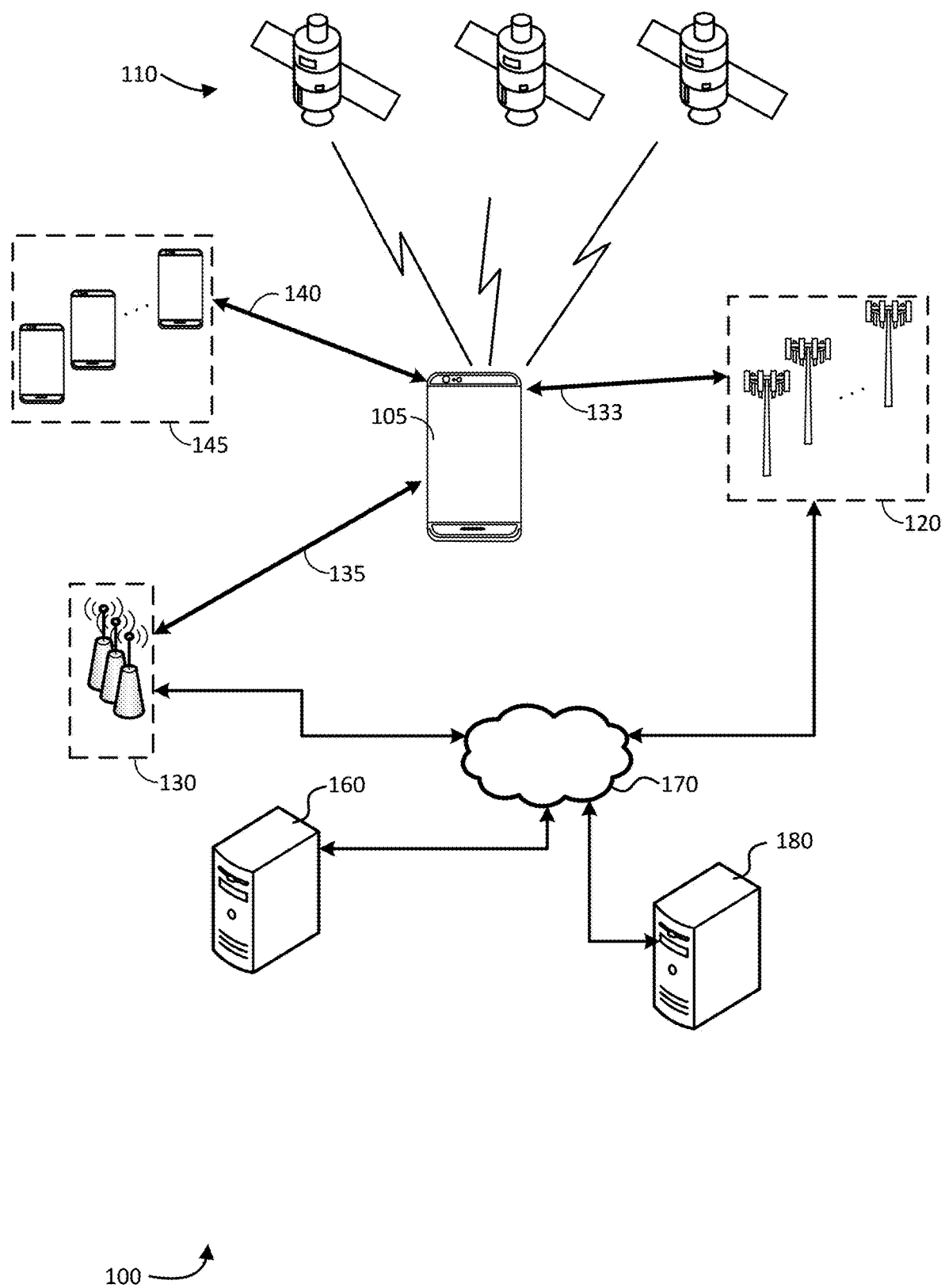
FIG. 1 illustrates an example positioning system in which a wireless device, location server (LS), and/or other components of the positioning system can use the techniques provided herein for bi-static radio-based object location detection.

The following description is directed to certain implementations for the purposes of describing innovative aspects of various embodiments. However, a person having ordinary skill in the art will readily recognize that the teachings herein can be applied in a multitude of different ways. The described implementations may be implemented in any device, system, or network that is capable of transmitting and receiving radio frequency (RF) signals according to any communication standard, such as any of the Institute of Electrical and Electronics Engineers (IEEE) IEEE 802.11 standards (including those identified as Wi-Fi® technologies), the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Rate Packet Data (HRPD), High Speed Packet Access (HSPA), High Speed Downlink Packet Access (HSDPA), High Speed Uplink Packet Access (HSUPA), Evolved High Speed Packet Access (HSPA+), Long Term Evolution (LTE), Advanced Mobile Phone System (AMPS), or other known signals that are used to communicate within a wireless, cellular or internet of things (IoT) network, such as a system utilizing 3G, 4G, 5G, 6G, or further implementations thereof, technology.

Examples are described herein in the context of systems and methods for bi-static radio-based object location detection. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

As used herein, a "wireless signal" comprises an electromagnetic wave that transports information through the space between a transmitter (or transmitting device) and a receiver (or receiving device). As used herein, a transmitter may transmit a single "wireless signal" or multiple "wireless signals" to a receiver. However, the receiver may receive multiple "wireless signals" corresponding to each transmitted wireless signal due to the propagation characteristics of wireless signals through multipath channels. The same transmitted wireless signal on different paths between the transmitter and receiver may be referred to as a "multipath" wireless signal People often use wireless devices to communicate with friends and family, e.g., by video chat, text messaging, etc., and to access information available over the Internet. However, wireless technology employs the use of wireless signals that may be used for functionality other than communicating information between electronic devices. For example, a user may have a mobile wireless device (or user equipment or "UE"), such as a wireless phone or tablet, that communicates with a distant wireless base station to wirelessly send and receive data via the wireless network. However, the user may wish to use the wireless device to provide information about the surrounding environment, such as to determine locations of nearby (or even distant) objects. To do so, the user can activate radar functionality within their wireless device that makes use of existing wireless infrastructure and radio transmissions.

For example, the user accesses object location detection functionality on their wireless device, which notifies the wireless network, via a nearby wireless base station the user's device is communicating with, that object location detection functionality will be used. The user's wireless device and the wireless base station then coordinate to determine the location of one or more objects in the vicinity.

To perform the object location detection functionality, the base station first determines the location of the user's wireless device by requesting its location. The user's wireless device then transmits its location to the base station. The base station then transmits an omnidirectional reference signal to the user's wireless device as well as certain timing information. The user's wireless device then determines the ToF and the AoA of the reference signal, assuming a direct line-of-sight (LOS) between the wireless base station and the user's wireless device. This direct-path signal (or substantially direct-path signal) will be referred to as the direct-path reference signal.

However, because the reference signal is transmitted omnidirectionally over a geographic region, it is reflected by one or more objects, and some of these reflections may then arrive at the user's wireless device. The wireless device receives these reflected versions of the reference signal and determines the corresponding ToF and AoA for one or more of them. The user's wireless device then transmits the ToF and AoA information to the base station.

The base station can then use the ToF information and the corresponding AoA information for the reflected reference signals to determine the locations of various objects in the environment. In particular, the ToF information for a reflected reference signal indicates information about an ellipse, where the base station and the user's wireless device represent focus points for the ellipse. In addition, the corresponding AoA provides additional information to identify a point on the ellipse corresponding to the object that reflected the reference signal. The point on the ellipse can then be translated to a geographical coordinate, e.g., a latitude and longitude, using the location information for either (or both) of the base station or the user device. Alternatively, the location on the ellipse can be used to determine the distance from the user device to the object and the heading to the object, thereby identifying a relative location of the object. By performing this technique for one or more reflected signals, the base station can determine the locations of multiple objects in the environment. And while the base station performed some of the processing in this example, the user's wireless device is also capable of sending a reference signal and performing the functionality discussed above.

Using these techniques, wireless devices may be able to help locate objects in an environment using readily available wireless technology and infrastructure rather than using more complex, specialized equipment. In addition, wireless devices provide information to enable electronic devices to learn about an environment, such as in the case of self-driving cars or other autonomous vehicles, or to enable user functionality such as providing locations of nearby landmarks, e.g., buildings, monuments, etc. Further, these techniques do not require the various objects in the environment to be enabled with any wireless capabilities. Instead, by using wireless transmissions that have been reflected from those objects, the objects themselves need not otherwise participate in the process.

This illustrative example is given to introduce the reader to the general subject matter discussed herein and the disclosure is not limited to this example. The following sections describe various additional non-limiting examples and examples of systems and methods for bi-static radio-based object location detection.

FIG. 1 is a simplified illustration of a positioning system 100 in which a UE 105, location server 160, and/or other components of the positioning system 100 can use the techniques provided herein for determining and estimated location of UE 105, according to an example. The techniques described herein may be implemented by one or more components of the positioning system 100. The positioning system 100 can include: a UE 105; one or more satellites 110 (also referred to as space vehicles (SVs)) for a Global Navigation Satellite System (GNSS) such as the Global Positioning System (GPS), GLONASS, Galileo or Beidou; base stations 120; access points (APs) 130; location server 160; network 170; and external client 180. Generally put, the positioning system 100 can estimate a location of the UE 105 based on RF signals received by and/or sent from the UE 105 and known locations of other components (e.g., GNSS satellites 110, base stations 120, APs 130) transmitting and/or receiving the RF signals. Additional details regarding particular location estimation techniques are discussed in more detail with regard to FIG. 2.

It should be noted that FIG. 1 provides only a generalized illustration of various components, any or all of which may be utilized as appropriate, and each of which may be duplicated as necessary. Specifically, although only one UE 105 is illustrated, it will be understood that many UEs (e.g., hundreds, thousands, millions, etc.) may utilize the positioning system 100. Similarly, the positioning system 100 may include a larger or smaller number of base stations 120 and/or APs 130 than illustrated in FIG. 1. The illustrated connections that connect the various components in the positioning system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, the external client 180 may be directly connected to location server 160. A person of ordinary skill in the art will recognize many modifications to the components illustrated.

Depending on desired functionality, the network 170 may comprise any of a variety of wireless and/or wireline networks. The network 170 can, for example, comprise any combination of public and/or private networks, local and/or wide-area networks, and the like. Furthermore, the network 170 may utilize one or more wired and/or wireless communication technologies. In some embodiments, the network 170 may comprise a cellular or other mobile network, a wireless local area network (WLAN), a wireless wide-area network (WWAN), and/or the Internet, for example. Examples of network 170 include a Long-Term Evolution (LTE) wireless network, a Fifth Generation (5G) wireless network (also referred to as New Radio (NR) wireless network or 5G NR wireless network), a Wi-Fi WLAN, and the Internet. LTE, 5G and NR are wireless technologies defined, or being defined, by the 3rd Generation Partnership Project (3GPP). Network 170 may also include more than one network and/or more than one type of network.

The base stations 120 and access points (APs) 130 are communicatively coupled to the network 170. In some embodiments, the base station 120s may be owned, maintained, and/or operated by a cellular network provider, and may employ any of a variety of wireless technologies, as described herein below. Depending on the technology of the network 170, a base station 120 may comprise a node B, an Evolved Node B (eNodeB or eNB), a base transceiver station (BTS), a radio base station (RBS), an NR NodeB (gNB), a Next Generation eNB (ng-eNB), or the like. A base station 120 that is a gNB or ng-eNB may be part of a Next Generation Radio Access Network (NG-RAN) which may connect to a 5G Core Network (5GC) in the case that Network 170 is a 5G network. An AP 130 may comprise a Wi-Fi AP or a Bluetooth® AP, for example. Thus, UE 105 can send and receive information with network-connected devices, such as location server 160, by accessing the network 170 via a base station 120 using a first communication link 133. Additionally or alternatively, because APs 130 also may be communicatively coupled with the network 170, UE 105 may communicate with network-connected and Internet-connected devices, including location server 160, using a second communication link 135.

As used herein, the term "base station" may generically refer to a single physical transmission point, or multiple co-located physical transmission points, which may be located at a base station 120. A Transmission Reception Point (TRP) (also known as transmit/receive point) corresponds to this type of transmission point, and the term "TRP" may be used interchangeably herein with the terms "gNB," "ng-eNB," and "base station." In some cases, a base station 120 may comprise multiple TRPs—e.g. with each TRP associated with a different antenna or a different antenna array for the base station 120. Physical transmission points may comprise an array of antennas of a base station 120 (e.g., as in a Multiple Input-Multiple Output (MIMO) system and/or where the base station employs beamforming). The term "base station" may additionally refer to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station).

As used herein, the term "cell" may generically refer to a logical communication entity used for communication with a base station 120, and may be associated with an identifier for distinguishing neighboring cells (e.g., a Physical Cell Identifier (PCID), a Virtual Cell Identifier (VCID)) operating via the same or a different carrier. In some examples, a carrier may support multiple cells, and different cells may be configured according to different protocol types (e.g., Machine-Type Communication (MTC), Narrowband Internet-of-Things (NB-IoT), Enhanced Mobile Broadband (eMBB), or others) that may provide access for different types of devices. In some cases, the term "cell" may refer to a portion of a geographic coverage area (e.g., a sector) over which the logical entity operates.

The location server 160 may comprise a server and/or other computing device configured to determine an estimated location of UE 105 and/or provide data (e.g., "assistance data") to UE 105 to facilitate location measurement and/or location determination by UE 105. According to some embodiments, location server 160 may comprise a Home Secure User Plane Location (SUPL) Location Platform (H-SLP), which may support the SUPL user plane (UP) location solution defined by the Open Mobile Alliance (OMA) and may support location services for UE 105 based on subscription information for UE 105 stored in location server 160. In some embodiments, the location server 160 may comprise, a Discovered SLP (D-SLP) or an Emergency SLP (E-SLP). The location server 160 may also comprise an Enhanced Serving Mobile Location Center (E-SMLC) that supports location of UE 105 using a control plane (CP) location solution for LTE radio access by UE 105. The location server 160 may further comprise a Location Management Function (LMF) that supports location of UE 105 using a control plane (CP) location solution for NR or LTE radio access by UE 105.

In a CP location solution, signaling to control and manage the location of UE 105 may be exchanged between elements of network 170 and with UE 105 using existing network interfaces and protocols and as signaling from the perspective of network 170. In a UP location solution, signaling to control and manage the location of UE 105 may be exchanged between location server 160 and UE 105 as data (e.g. data transported using the Internet Protocol (IP) and/or Transmission Control Protocol (TCP)) from the perspective of network 170.

As previously noted (and discussed in more detail below), the estimated location of UE 105 may be based on measurements of RF signals sent from and/or received by the UE 105. In particular, these measurements can provide information regarding the relative distance and/or angle of the UE 105 from one or more components in the positioning system 100 (e.g., GNSS satellites 110, APs 130, base stations 120). The estimated location of the UE 105 can be estimated geometrically (e.g., using multiangulation and/or multilateration), based on the distance and/or angle measurements, along with known position of the one or more components.

Although terrestrial components such as APs 130 and base stations 120 may be fixed, embodiments are not so limited. Mobile components may be used. For example, in some embodiments, a location of the UE 105 may be estimated at least in part based on measurements of RF signals 140 communicated between the UE 105 and one or more other UEs 145, which may be mobile or fixed. When or more other UEs 145 are used in the position determination of a particular UE 105, the UE 105 for which the position is to be determined may be referred to as the "target UE," and each of the one or more other UEs 145 used may be referred to as an "anchor UE." For position determination of a target UE, the respective positions of the one or more anchor UEs may be known and/or jointly determined with the target UE. Direct communication between the one or more other UEs 145 and UE 105 may comprise sidelink and/or similar Device-to-Device (D2D) communication technologies. Sidelink, which is defined by 3GPP, is a form of D2D communication under the cellular-based LTE and NR standards.

An estimated location of UE 105 can be used in a variety of applications—e.g. to assist direction finding or navigation for a user of UE 105 or to assist another user (e.g. associated with external client 180) to locate UE 105. A "location" is also referred to herein as a "location estimate", "estimated location", "location", "position", "position estimate", "position fix", "estimated position", "location fix" or "fix". The process of determining a location may be referred to as "positioning," "position determination," "location determination," or the like. A location of UE 105 may comprise an absolute location of UE 105 (e.g. a latitude and longitude and possibly altitude) or a relative location of UE 105 (e.g. a location expressed as distances north or south, east or west and possibly above or below some other known fixed location or some other location such as a location for UE 105 at some known previous time). A location may be specified as a geodetic location comprising coordinates which may be absolute (e.g. latitude, longitude and optionally altitude), relative (e.g. relative to some known absolute location) or local (e.g. X, Y and optionally Z coordinates according to a coordinate system defined relative to a local area such a factory, warehouse, college campus, shopping mall, sports stadium or convention center). A location may instead be a civic location and may then comprise one or more of a street address (e.g. including names or labels for a country, state, county, city, road and/or street, and/or a road or street number), and/or a label or name for a place, building, portion of a building, floor of a building, and/or room inside a building etc. A location may further include an uncertainty or error indication, such as a horizontal and possibly vertical distance by which the location is expected to be in error or an indication of an area or volume (e.g. a circle or ellipse) within which UE 105 is expected to be located with some level of confidence (e.g. 95% confidence).

The external client 180 may be a web server or remote application that may have some association with UE 105 (e.g. may be accessed by a user of UE 105) or may be a server, application, or computer system providing a location service to some other user or users which may include obtaining and providing the location of UE 105 (e.g. to enable a service such as friend or relative finder, asset tracking or child or pet location). Additionally or alternatively, the external client 180 may obtain and provide the location of UE 105 to an emergency services provider, government agency, etc.

Figure 2:
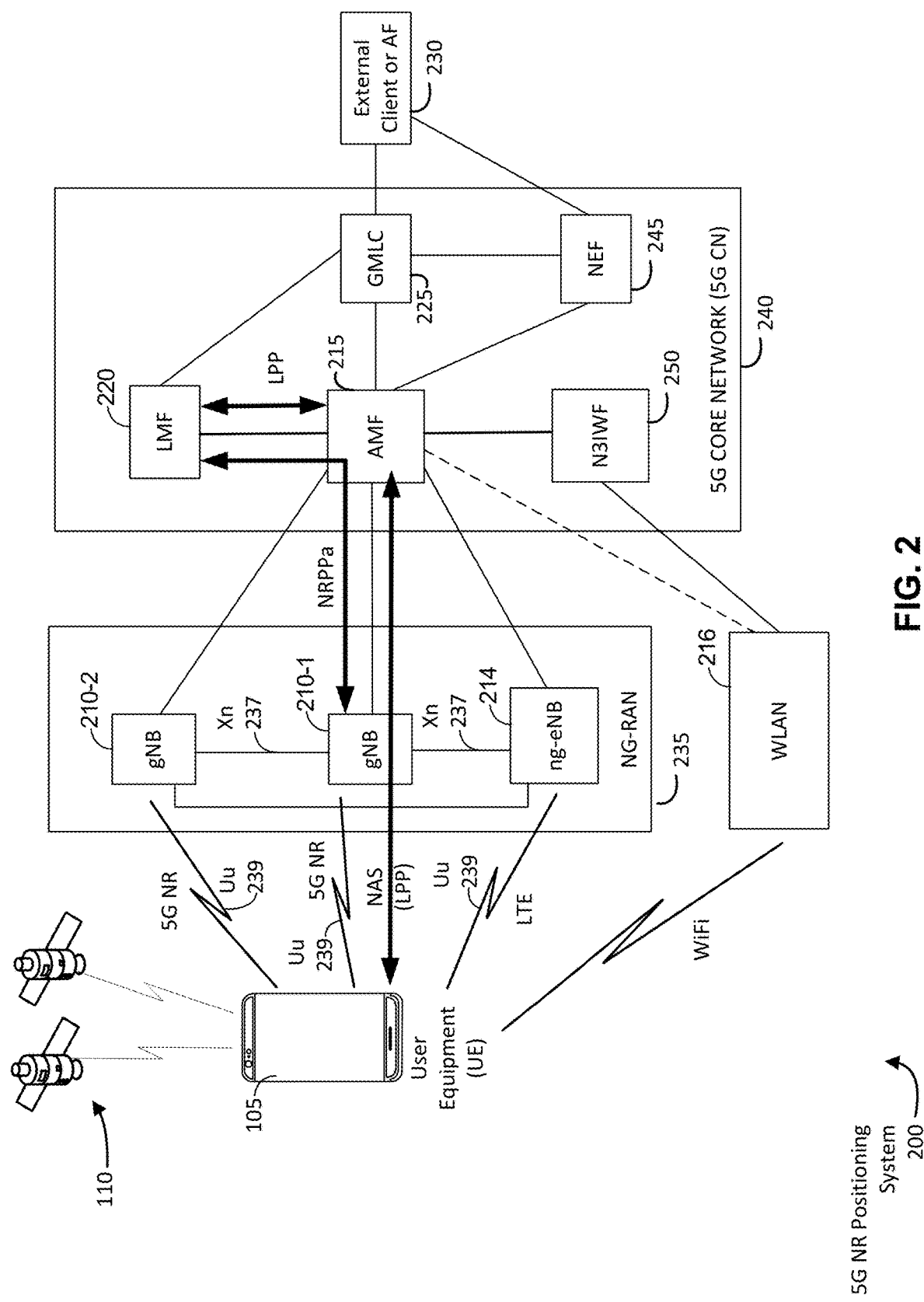
FIG. 2 illustrates an example 5G new radio (NR) positioning system suitable for use with example systems and methods for bi-static radio-based object location detection.

As previously noted, the example positioning system 100 can be implemented using a wireless communication network, such as an LTE-based or 5G NR-based network. FIG. 2 shows a diagram of a 5G NR positioning system 200, illustrating an example of a positioning system (e.g., positioning system 100) implementing 5G NR. The 5G NR positioning system 200 may be configured to determine the location of a UE 105 by using access nodes 210, 214, 216 (which may correspond with base stations 120 and access points 130 of FIG. 1) and (optionally) an LMF 220 (which may correspond with location server 160) to implement one or more positioning methods. Here, the 5G NR positioning system 200 comprises a UE 105, and components of a 5G NR network comprising a Next Generation (NG) Radio Access Network (RAN) (NG-RAN) 235 and a 5G Core Network (5G CN) 240. A 5G network may also be referred to as an NR network; NG-RAN 235 may be referred to as a 5G RAN or as an NR RAN; and 5G CN 240 may be referred to as an NG Core network. The 5G NR positioning system 200 may further utilize information from GNSS satellites 110 from a GNSS system like Global Positioning System (GPS) or similar system (e.g. GLONASS, Galileo, Beidou, Indian Regional Navigational Satellite System (IRNSS)). Additional components of the 5G NR positioning system 200 are described below. The 5G NR positioning system 200 may include additional or alternative components.

It should be noted that FIG. 2 provides only a generalized illustration of various components, any or all of which may be utilized as appropriate, and each of which may be duplicated or omitted as necessary. Specifically, although only one UE 105 is illustrated, it will be understood that many UEs (e.g., hundreds, thousands, millions, etc.) may utilize the 5G NR positioning system 200. Similarly, the 5G NR positioning system 200 may include a larger (or smaller) number of GNSS satellites 110, gNBs 210, ng-eNBs 214, Wireless Local Area Networks (WLANs) 216, Access and mobility Management Functions (AMF)s 215, external clients 230, and/or other components. The illustrated connections that connect the various components in the 5G NR positioning system 200 include data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 105 may comprise and/or be referred to as a device, a mobile device, a wireless device, a mobile terminal, a terminal, a mobile station (MS), a Secure User Plane Location (SUPL)-Enabled Terminal (SET), or by some other name. Moreover, UE 105 may correspond to a cellphone, smartphone, laptop, tablet, personal data assistant (PDA), navigation device, Internet of Things (IoT) device, or some other portable or moveable device. Typically, though not necessarily, the UE 105 may support wireless communication using one or more Radio Access Technologies (RATs) such as using GSM, CDMA, W-CDMA, LTE, High Rate Packet Data (HRPD), IEEE 802.11 Wi-Fi®, Bluetooth, Worldwide Interoperability for Microwave Access (WiMAX™), 5G NR (e.g., using the NG-RAN 235 and 5G CN 240), etc. The UE 105 may also support wireless communication using a WLAN 216 which (like the one or more RATs, and as previously noted with respect to FIG. 1) may connect to other networks, such as the Internet. The use of one or more of these RATs may allow the UE 105 to communicate with an external client 230 (e.g., via elements of 5G CN 240 not shown in FIG. 2, or possibly via a Gateway Mobile Location Center (GMLC) 225) and/or allow the external client 230 to receive location information regarding the UE 105 (e.g., via the GMLC 225). The external client 230 of FIG. 2 may correspond to external client 180 of FIG. 1, as implemented in or communicatively coupled with a 5G NR network.

The UE 105 may include a single entity or may include multiple entities, such as in a personal area network where a user may employ audio, video and/or data I/O devices, and/or body sensors and a separate wireline or wireless modem. An estimate of a location of the UE 105 may be referred to as a location, location estimate, location fix, fix, position, position estimate, or position fix, and may be geodetic, thus providing location coordinates for the UE 105 (e.g., latitude and longitude), which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geodetically or in civic form) within which the UE 105 is expected to be located with some probability or confidence level (e.g., 67%, 95%, etc.). A location of the UE 105 may further be a relative location comprising, for example, a distance and direction or relative X, Y (and Z) coordinates defined relative to some origin at a known location which may be defined geodetically, in civic terms, or by reference to a point, area, or volume indicated on a map, floor plan or building plan. In the description contained herein, the use of the term location may comprise any of these variants unless indicated otherwise. When computing the location of a UE, it is common to solve for local X, Y, and possibly Z coordinates and then, if needed, convert the local coordinates into absolute ones (e.g. for latitude, longitude and altitude above or below mean sea level).

Base stations in the NG-RAN 235 shown in FIG. 2 may correspond to base stations 120 in FIG. 1 and may include NR NodeB (gNB) 210-1 and 210-2 (collectively and generically referred to herein as gNBs 210). Pairs of gNBs 210 in NG-RAN 235 may be connected to one another (e.g., directly as shown in FIG. 2 or indirectly via other gNBs 210). The communication interface between base stations (gNBs 210 and/or ng-eNB 214) may be referred to as an Xn interface 237. Access to the 5G network is provided to UE 105 via wireless communication between the UE 105 and one or more of the gNBs 210, which may provide wireless communications access to the 5G CN 240 on behalf of the UE 105 using 5G NR. The wireless interface between base stations (gNBs 210 and/or ng-eNB 214) and the UE 105 may be referred to as a Uu interface 239. 5G NR radio access may also be referred to as NR radio access or as 5G radio access. In FIG. 2, the serving gNB for UE 105 is assumed to be gNB 210-1, although other gNBs (e.g. gNB 210-2) may act as a serving gNB if UE 105 moves to another location or may act as a secondary gNB to provide additional throughput and bandwidth to UE 105.

Base stations in the NG-RAN 235 shown in FIG. 2 may also or instead include a next generation evolved Node B, also referred to as an ng-eNB, 214. Ng-eNB 214 may be connected to one or more gNBs 210 in NG-RAN 235—e.g. directly or indirectly via other gNBs 210 and/or other ng-eNBs. An ng-eNB 214 may provide LTE wireless access and/or evolved LTE (eLTE) wireless access to UE 105. Some gNBs 210 (e.g. gNB 210-2) and/or ng-eNB 214 in FIG. 2 may be configured to function as positioning-only beacons which may transmit signals (e.g., Positioning Reference Signal (PRS)) and/or may broadcast assistance data to assist positioning of UE 105 but may not receive signals from UE 105 or from other UEs. It is noted that while only one ng-eNB 214 is shown in FIG. 2, some embodiments may include multiple ng-eNBs 214. Base stations 210, 214 may communicate directly with one another via an Xn communication interface. Additionally or alternatively, base stations 210, 214 may communicate directly or indirectly with other components of the 5G NR positioning system 200, such as the LMF 220 and AMF 215.

5G NR positioning system 200 may also include one or more WLANs 216 which may connect to a Non-3GPP InterWorking Function (N3IWF) 250 in the 5G CN 240 (e.g., in the case of an untrusted WLAN 216). For example, the WLAN 216 may support IEEE 802.11 Wi-Fi access for UE 105 and may comprise one or more Wi-Fi APs (e.g., APs 130 of FIG. 1). Here, the N3IWF 250 may connect to other elements in the 5G CN 240 such as AMF 215. In some embodiments, WLAN 216 may support another RAT such as Bluetooth. The N3IWF 250 may provide support for secure access by UE 105 to other elements in 5G CN 240 and/or may support interworking of one or more protocols used by WLAN 216 and UE 105 to one or more protocols used by other elements of 5G CN 240 such as AMF 215. For example, N3IWF 250 may support IPSec tunnel establishment with UE 105, termination of IKEv2/IPSec protocols with UE 105, termination of N2 and N3 interfaces to 5G CN 240 for control plane and user plane, respectively, relaying of uplink (UL) and downlink (DL) control plane Non-Access Stratum (NAS) signaling between UE 105 and AMF 215 across an N1 interface. In some other embodiments, WLAN 216 may connect directly to elements in 5G CN 240 (e.g. AMF 215 as shown by the dashed line in FIG. 2) and not via N3IWF 250. For example, direct connection of WLAN 216 to 5GCN 240 may occur if WLAN 216 is a trusted WLAN for 5GCN 240 and may be enabled using a Trusted WLAN Interworking Function (TWIF) (not shown in FIG. 2) which may be an element inside WLAN 216. It is noted that while only one WLAN 216 is shown in FIG. 2, some embodiments may include multiple WLANs 216.

Access nodes may comprise any of a variety of network entities enabling communication between the UE 105 and the AMF 215. This can include gNBs 210, ng-eNB 214, WLAN 216, and/or other types of cellular base stations. However, access nodes providing the functionality described herein may additionally or alternatively include entities enabling communications to any of a variety of RATs not illustrated in FIG. 2, which may include non-cellular technologies. Thus, the term "access node," as used in the embodiments described herein below, may include but is not necessarily limited to a gNB 210, ng-eNB 214 or WLAN 216.

In some embodiments, an access node, such as a gNB 210, ng-eNB 214, or WLAN 216 (alone or in combination with other components of the 5G NR positioning system 200), may be configured to, in response to receiving a request for location information from the LMF 220, obtain location measurements of uplink (UL) signals received from the UE 105) and/or obtain downlink (DL) location measurements from the UE 105 that were obtained by UE 105 for DL signals received by UE 105 from one or more access nodes. As noted, while FIG. 2 depicts access nodes 210, 214, and 216 configured to communicate according to 5G NR, LTE, and Wi-Fi communication protocols, respectively, access nodes configured to communicate according to other communication protocols may be used, such as, for example, a Node B using a Wideband Code Division Multiple Access (WCDMA) protocol for a Universal Mobile Telecommunications Service (UMTS) Terrestrial Radio Access Network (UTRAN), an eNB using an LTE protocol for an Evolved UTRAN (E-UTRAN), or a Bluetooth® beacon using a Bluetooth protocol for a WLAN. For example, in a 4G Evolved Packet System (EPS) providing LTE wireless access to UE 105, a RAN may comprise an E-UTRAN, which may comprise base stations comprising eNBs supporting LTE wireless access. A core network for EPS may comprise an Evolved Packet Core (EPC). An EPS may then comprise an E-UTRAN plus an EPC, where the E-UTRAN corresponds to NG-RAN 235 and the EPC corresponds to 5GCN 240 in FIG. 2. The methods and techniques described herein for obtaining a civic location for UE 105 may be applicable to such other networks.

The gNBs 210 and ng-eNB 214 can communicate with an AMF 215, which, for positioning functionality, communicates with an LMF 220. The AMF 215 may support mobility of the UE 105, including cell change and handover of UE 105 from an access node 210, 214, or 216 of a first RAT to an access node 210, 214, or 216 of a second RAT. The AMF 215 may also participate in supporting a signaling connection to the UE 105 and possibly data and voice bearers for the UE 105. The LMF 220 may support positioning of the UE 105 using a CP location solution when UE 105 accesses the NG-RAN 235 or WLAN 216 and may support position procedures and methods, including UE assisted/UE based and/or network based procedures/methods, such as Assisted GNSS (A-GNSS), Observed Time Difference Of Arrival (OTDOA) (which may be referred to in NR as Time Difference Of Arrival (TDOA)), Real Time Kinematic (RTK), Precise Point Positioning (PPP), Differential GNSS (DGNSS), Enhance Cell ID (ECID), angle of arrival (AoA), angle of departure (AoD), WLAN positioning, round trip signal propagation delay (RTT), multi-cell RTT, and/or other positioning procedures and methods. The LMF 220 may also process location service requests for the UE 105, e.g., received from the AMF 215 or from the GMLC 225. The LMF 220 may be connected to AMF 215 and/or to GMLC 225. In some embodiments, a network such as 5GCN 240 may additionally or alternatively implement other types of location-support modules, such as an Evolved Serving Mobile Location Center (E-SMLC) or a SUPL Location Platform (SLP). It is noted that in some embodiments, at least part of the positioning functionality (including determination of a UE 105's location) may be performed at the UE 105 (e.g., by measuring downlink PRS (DL-PRS) signals transmitted by wireless nodes such as gNBs 210, ng-eNB 214 and/or WLAN 216, and/or using assistance data provided to the UE 105, e.g., by LMF 220).

The Gateway Mobile Location Center (GMLC) 225 may support a location request for the UE 105 received from an external client 230 and may forward such a location request to the AMF 215 for forwarding by the AMF 215 to the LMF 220. A location response from the LMF 220 (e.g., containing a location estimate for the UE 105) may be similarly returned to the GMLC 225 either directly or via the AMF 215, and the GMLC 225 may then return the location response (e.g., containing the location estimate) to the external client 230.

A Network Exposure Function (NEF) 245 may be included in 5GCN 240. The NEF 245 may support secure exposure of capabilities and events concerning 5GCN 240 and UE 105 to the external client 230, which may then be referred to as an Access Function (AF) and may enable secure provision of information from external client 230 to 5GCN 240. NEF 245 may be connected to AMF 215 and/or to GMLC 225 for the purposes of obtaining a location (e.g. a civic location) of UE 105 and providing the location to external client 230.

As further illustrated in FIG. 2, the LMF 220 may communicate with the gNBs 210 and/or with the ng-eNB 214 using an NR Positioning Protocol annex (NRPPa) as defined in 3GPP Technical Specification (TS) 38.445. NRPPa messages may be transferred between a gNB 210 and the LMF 220, and/or between an ng-eNB 214 and the LMF 220, via the AMF 215. As further illustrated in FIG. 2, LMF 220 and UE 105 may communicate using an LTE Positioning Protocol (LPP) as defined in 3GPP TS 37.355. Here, LPP messages may be transferred between the UE 105 and the LMF 220 via the AMF 215 and a serving gNB 210-1 or serving ng-eNB 214 for UE 105. For example, LPP messages may be transferred between the LMF 220 and the AMF 215 using messages for service-based operations (e.g., based on the Hypertext Transfer Protocol (HTTP)) and may be transferred between the AMF 215 and the UE 105 using a 5G NAS protocol. The LPP protocol may be used to support positioning of UE 105 using UE assisted and/or UE based position methods such as A-GNSS, RTK, TDOA, multi-cell RTT, AoD, and/or ECID. The NRPPa protocol may be used to support positioning of UE 105 using network based position methods such as ECID, AoA, uplink TDOA (UL-TDOA) and/or may be used by LMF 220 to obtain location related information from gNBs 210 and/or ng-eNB 214, such as parameters defining DL-PRS transmission from gNBs 210 and/or ng-eNB 214.

In the case of UE 105 access to WLAN 216, LMF 220 may use NRPPa and/or LPP to obtain a location of UE 105 in a similar manner to that just described for UE 105 access to a gNB 210 or ng-eNB 214. Thus, NRPPa messages may be transferred between a WLAN 216 and the LMF 220, via the AMF 215 and N3IWF 250 to support network-based positioning of UE 105 and/or transfer of other location information from WLAN 216 to LMF 220. Alternatively, NRPPa messages may be transferred between N3IWF 250 and the LMF 220, via the AMF 215, to support network-based positioning of UE 105 based on location related information and/or location measurements known to or accessible to N3IWF 250 and transferred from N3IWF 250 to LMF 220 using NRPPa. Similarly, LPP and/or LPP messages may be transferred between the UE 105 and the LMF 220 via the AMF 215, N3IWF 250, and serving WLAN 216 for UE 105 to support UE assisted or UE based positioning of UE 105 by LMF 220.

In a 5G NR positioning system 200, positioning methods can be categorized as being "UE assisted" or "UE based." This may depend on where the request for determining the position of the UE 105 originated. If, for example, the request originated at the UE (e.g., from an application, or "app," executed by the UE), the positioning method may be categorized as being UE based. If, on the other hand, the request originates from an external client or AF 230, LMF 220, or other device or service within the 5G network, the positioning method may be categorized as being UE assisted (or "network-based").

With a UE-assisted position method, UE 105 may obtain location measurements and send the measurements to a location server (e.g., LMF 220) for computation of a location estimate for UE 105. For RAT-dependent position methods location measurements may include one or more of a Received Signal Strength Indicator (RSSI), RTT, Reference Signal Received Power (RSRP), Reference Signal Received Quality (RSRQ), Reference Signal Time Difference (RSTD), Time of Arrival (TOA), AoA, Receive Time-Transmission Time Difference (Rx-Tx), Differential AoA (DAoA), AoD, or Timing Advance (TA) for gNBs 210, ng-eNB 214, and/or one or more access points for WLAN 216. Additionally or alternatively, similar measurements may be made of sidelink signals transmitted by other UEs, which may serve as anchor points for positioning of the UE 105 if the positions of the other UEs are known. The location measurements may also or instead include measurements for RAT-independent positioning methods such as GNSS (e.g., GNSS pseudorange, GNSS code phase, and/or GNSS carrier phase for GNSS satellites 110), WLAN, etc.

With a UE-based position method, UE 105 may obtain location measurements (e.g., which may be the same as or similar to location measurements for a UE assisted position method) and may further compute a location of UE 105 (e.g., with the help of assistance data received from a location server such as LMF 220, an SLP, or broadcast by gNBs 210, ng-eNB 214, or WLAN 216).

With a network based position method, one or more base stations (e.g., gNBs 210 and/or ng-eNB 214), one or more APs (e.g., in WLAN 216), or N3IWF 250 may obtain location measurements (e.g., measurements of RSSI, RTT, RSRP, RSRQ, AoA, or TOA) for signals transmitted by UE 105, and/or may receive measurements obtained by UE 105 or by an AP in WLAN 216 in the case of N3IWF 250, and may send the measurements to a location server (e.g., LMF 220) for computation of a location estimate for UE 105.

Positioning of the UE 105 also may be categorized as UL, DL, or DL-UL based, depending on the types of signals used for positioning. If, for example, positioning is based solely on signals received at the UE 105 (e.g., from a base station or other UE), the positioning may be categorized as DL based. On the other hand, if positioning is based solely on signals transmitted by the UE 105 (which may be received by a base station or other UE, for example), the positioning may be categorized as UL based. Positioning that is DL-UL based includes positioning, such as RTT-based positioning, that is based on signals that are both transmitted and received by the UE 105. Sidelink (SL)-assisted positioning comprises signals communicated between the UE 105 and one or more other UEs. According to some embodiments, UL, DL, or DL-UL positioning as described herein may be capable of using SL signaling as a complement or replacement of SL, DL, or DL-UL signaling.

Depending on the type of positioning (e.g., UL, DL, or DL-UL based) the types of reference signals used can vary. For DL-based positioning, for example, these signals may comprise PRS (e.g., DL-PRS transmitted by base stations or SL-PRS transmitted by other UEs), which can be used for TDOA, AoD, and RTT measurements. Other reference signals that can be used for positioning (UL, DL, or DL-UL) may include Sounding Reference Signal (SRS), Channel State Information Reference Signal (CSI-RS), synchronization signals (e.g., synchronization signal block (SSB) Synchronizations Signal (SS)), Physical Uplink Control Channel (PUCCH), Physical Uplink Shared Channel (PUSCH), Physical Sidelink Shared Channel (PSSCH), Demodulation Reference Signal (DMRS), etc. Moreover, reference signals may be transmitted in a Tx beam and/or received in an Rx beam (e.g., using beamforming techniques), which may impact angular measurements, such as AoD and/or AoA.

Referring now to FIGS. 3A-3B, FIG. 3A illustrates an example system 300 for bi-static radio-based object location detection. The system 300 this example includes a wireless base station 310 (e.g., a base station 120 of FIG. 1 and/or gNB 210 or ng-eNB 214 of FIG. 2) and a user device 320 (e.g., a UE 105 of FIGS. 1 and/or 2), each of which may be referred to as a "wireless device." In addition, an object 330 is in the environment served by the base station 310. In this example, the base station 310 and the user device 320 communicate using 5G frequency bands (e.g., 28 GHz). However, other millimeter-wave (or "mmWave") radio frequencies may be used as well, including frequencies ranging from 30-300 GHz, which includes, for example, frequencies utilized by the 802.11ad Wi-Fi standard (operating at 60 GHz). Because positioning functionality according to this disclosure may be performed in the same frequency bands as communication, hardware may be utilized for both communication and location sensing. For example, one or more of the components of the system 300 shown in FIG. 3A may employ a wireless modem (e.g., Wi-Fi or 5G modem).

In this example, the base station 310 is a 5G wireless base station as discussed above with respect to FIGS. 1-2, but in other examples, the base station 310 may be any suitable wireless access point to a network, such as a Wi-Fi access point. Similarly, the user device 320 depicted in FIG. 3A is a 5G wireless device, but in other examples may employ any suitable wireless communications technology, including Wi-Fi. For example, hardware to enable functionality described in this disclosure may be integrated into mobile phones as well as many other types of devices or vehicles. These can include, for example, other mobile devices (e.g., tablets, portable media players, laptops, wearable devices, virtual reality (VR) devices, augmented reality (AR) devices), as well as other electronic devices (e.g., security devices, on-vehicle systems). That said, electronic devices are not limited to mobile devices and instead may be integrated into fixed wireless stations, and as such may be installed in or on a building or other structure.

One of the advantages of using wireless technology in some examples is that existing wireless devices can be used to perform object location detection. For example, a conventional wireless network, e.g., a 5G wireless network, could implement software to perform the functionality described herein using existing infrastructure. Any suitable wireless signal could be used as the reference signal discussed herein. Similarly, Wi-Fi or other access-point-based communication networking modalities may be used in some examples. Such access points or base stations can coordinate with other wireless devices to detect objects in the environment and determine their locations.

FIG. 3B illustrates the use of techniques according to this disclosure to determine the location of the object 330 in the environment served by the base station 310. When the base station 310 and user device 320 communicate, they each transmit radio signals that propagate through the environment and arrive at the other device. In an idealized environment that only includes the user device 320 and the base station 310, the wireless signals will traverse a direct path 340 between the two devices 310, 320; however, in reality, transmitted wireless signals may also reflect off of other objects in the area resulting in potentially many reflected versions of the signal arriving at the receiver's antenna(s). For example, a base station 310 that uses an omnidirectional transmitter will transmit signals in multiple directions at the same time. As these signals propagate, they may encounter objects and reflect off of them, ultimately arriving at the receiver's antenna. This propagation of multiple versions of the same signal, e.g., due to reflection, is generally referred to as "multipath." Examples according to this disclosure take advantage of such multipath signal propagation as will be discussed in more detail below.

In addition to such omnidirectional transmission, some base stations 110 may employ beamforming to transmit signals into an environment. For example, a base station may sweep a beam across an arc, e.g., 90-degrees, 120-degrees, etc. through an environment to transmit signals. Thus, as the base station 110 sweeps the signal through the environment, at some time, it will be directed at the receiver's antenna, which receives it via a direct transmission path. At other times, the beam may be reflected by objects in the environment and ultimately arrive at the receiver's antenna via the reflected path. While the two different signals will have many of the same characteristics, such as data encoded on the beam, they will have been transmitted at different times and thus may be considered separate signals, despite both being conceptually the same signal. However, techniques according to this disclosure may employ either omnidirectional or beamformed signal transmissions.

In this example, the environment includes the base station 310 and the user device 320 and the object 330. Thus, as transmitted signals propagate between the base station 310 and the user device 320 some signals are received via the direct path 340 and some via a reflected path 342a-b off of the object 330. By determining signal characteristics of each type of received signal—direct-path and reflected-path—and by knowing the location $(X_{BS}, Y_{BS})$ or $(X_{UD}, Y_{UD})$ of one or both wireless devices 310, 320, the location $(X_O, Y_O)$ of the object 330 can be determined.

Figure 4A:
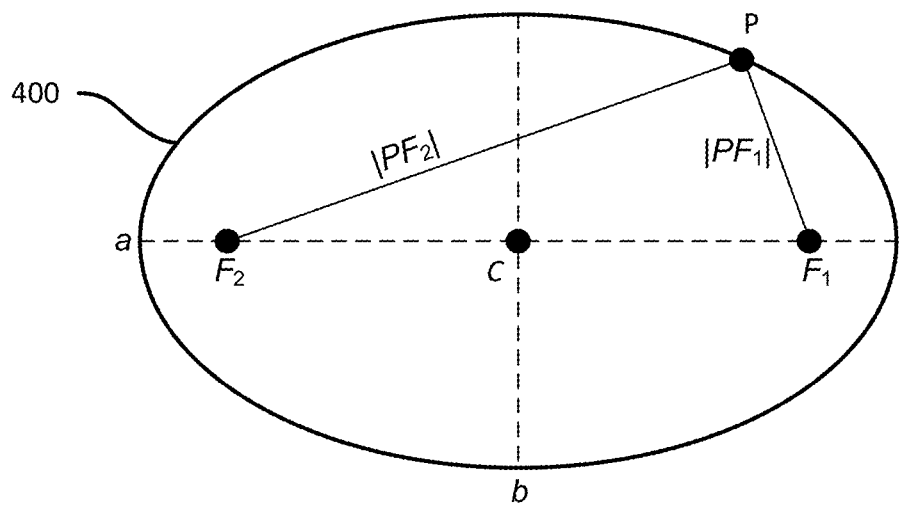
FIGS. 4A-4B show example ellipses and corresponding parameters that may employed by example systems and methods for bi-static radio-based object location detection.
Figure 4B:
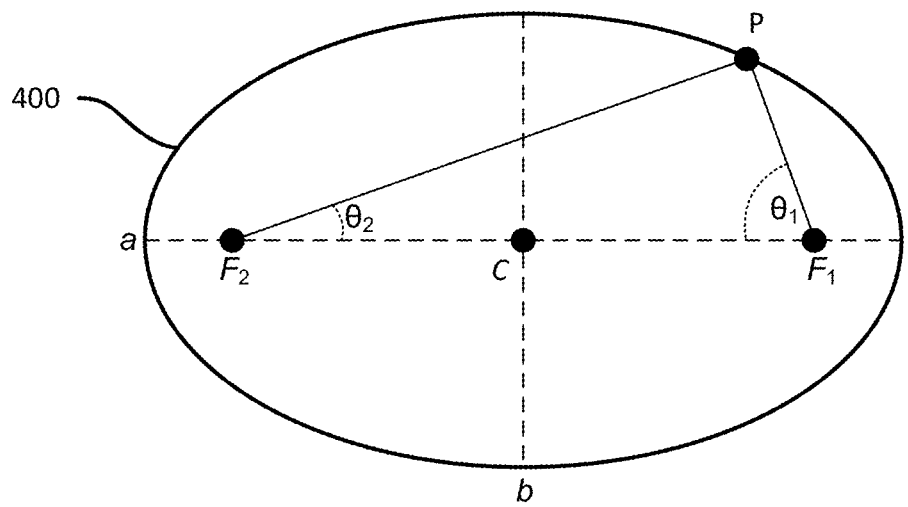

Referring now to FIGS. 4A-4B, FIG. 4A illustrates an ellipse 400 and corresponding ellipse information that can be used to locate an object at an arbitrary point on the ellipse 400, so long as certain information is known. An ellipse is defined by two focus points, $F_1$ and $F_2$, a semi-major axis, a, and a semi-minor axis, b. The ellipse then includes all of the points having the same sum of distances, $|PF_1|+|PF_2|$, relative to focus points, $F_1$ and $F_2$. In the system 300 shown in FIG. 3A, an ellipse may be determined by setting the base station 310 and user device 320 as the focus points and using ToF information for reflected signals from an object 330. For example, a time-of-flight measurement between a transmit antenna array (e.g., base station 310) located at $F_1$ and an receiver antenna array (e.g., user device 320) located at $F_2$, in which the wireless signal reflected off of an object 330 at point P would correspond to a distance measurement of $|PF_1|+|PF_2|$. An ellipse can then be calculated using the two focus points and the distance measurement (as discussed above), and a location of the object can be estimated based on the geometry of the ellipse and the determined signal characteristics.

For example, according to some examples in which a system for bi-static radio-based object location detection detects an object, the object can be assumed to be on the ground or in substantially the same horizontal plane as both the base station 310 and user device 320. (It can be noted that in some examples, antenna elements may be offset from the coordinate system used to establish azimuth and elevation. In such examples, the determination of the ellipse and the distance can account for this offset.)

FIG. 4B illustrates how the geometry of an ellipse can be leveraged to determine a location of an object, e.g., object 330. As discussed above, a wireless device determines both a ToF and an AoA for received signals, e.g., wireless signals following the reflected path 342a-b. Thus, depending on which wireless device 310, 320 receives the reflected signal 342a-b, the AoA will correspond to one of $\theta_1$ or $\theta_2$. The location of the object can then be calculated based on the properties of the ellipse. First, the semi-major and semi-minor axis lengths may be determined with the following equations:

$$a=|PF_1|+|PF_2|, \tag{1}$$

and $$b=\sqrt{a^2-(F_1-C)^2}. \tag{2}$$

Then the ellipse itself can be calculated as follows:

$$\frac{x^2}{a^2}+\frac{y^2}{b^2}=1. \tag{3}$$

Equation (3) assumes that the center of the ellipse (the point that is collinear with and equidistant between the focus points, $F_1$ and $F_2$) is (0, 0), which can be used for calculation purposes before mapping the ellipse onto another coordinate system, e.g., based on latitude and longitude.

Once the shape of the ellipse is known, the location of the object may be determined based on the determined AoA at the respective device, either $\theta_1$ or $\theta_2$. The corresponding point, P, on the ellipse is the location of the object. For example, a ray originating at one of the focus points and projected at the AoA will intersect with the ellipse at the location of the object, represented by point, P. Thus, by finding the point of intersection between the ray and the ellipse, the location of the object may be determined.

Alternatively, the ellipse may be defined using polar coordinates relative to one of the two focus points, which may provide another way to determine the location of an arbitrary point on the ellipse, given the AoA. The two axes are determined as discussed above with respect to equations (1) and (2). Next, the eccentricity of the ellipse is determined by:

$$e = \sqrt{1 - \frac{b^2}{a^2}}. \qquad (4)$$

Finally, the ellipse may be calculated based on a focus and an angle, $\theta$:

$$r = \frac{a(1-e^2)}{1 - e \cos\theta}. \qquad (5)$$

Thus, using the ellipse and the known AoA, the location of the object may be determined.

Figure 5:
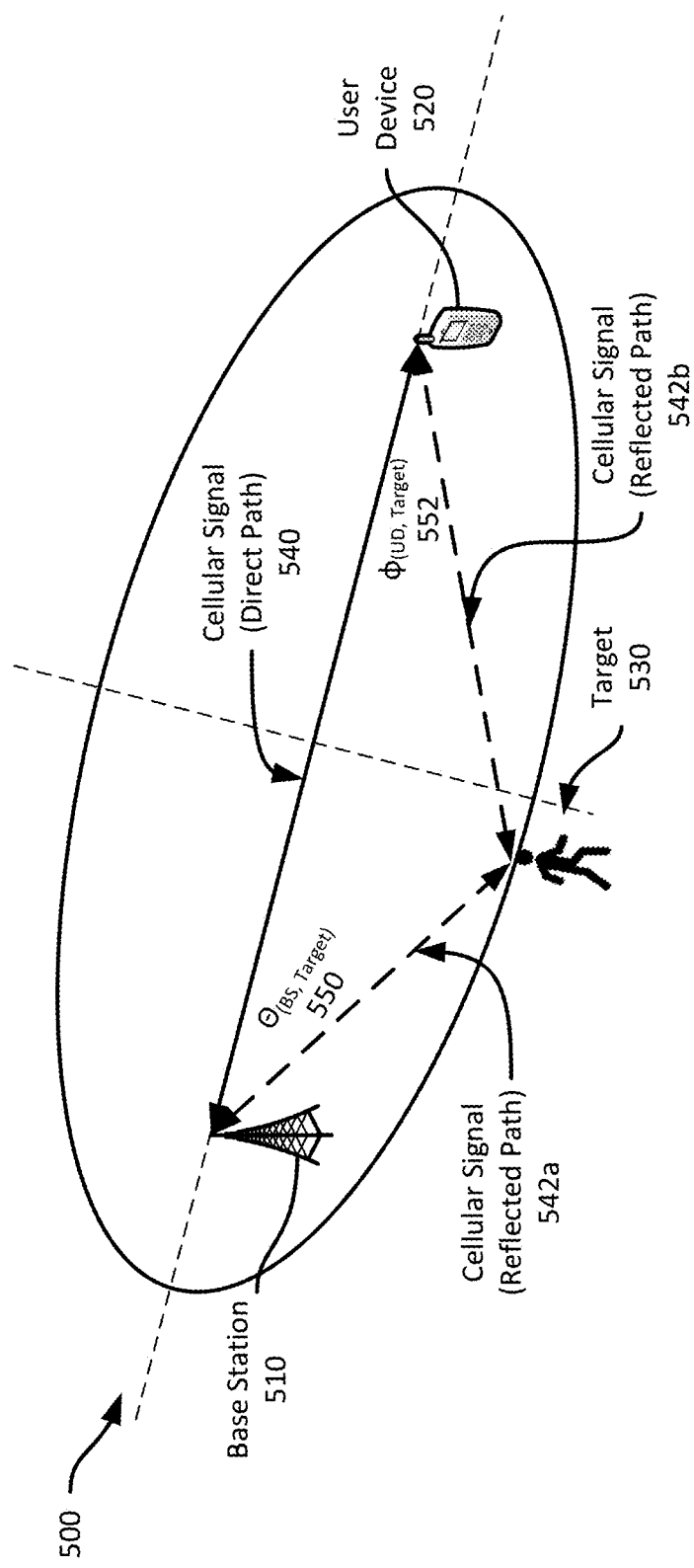
FIG. 5 shows an example system for bi-static radio-based object location detection.

FIG. 5 is a diagram of an example system 500 for bi-static radio-based object location detection. The system 500 is attempting to determine the location of the target 530 according to the disclosed techniques herein. As discussed above, the base station 510 and the user device 520 communicate using RF signals that traverse the environment around the user device 520 and the base station 510. (Again, the base station 510 and user device 520 may correspond with base stations and/or user devices/mobile devices as described previously.) Ideally, the signals would traverse a direct path 540 between the base station 510 and the user device 520, however, some signal reflection does occur, resulting in multiple copies of the same signal arriving at the receiving device at different times.

In this example, one of the two wireless devices, i.e., the base station 510 and the user device 520, attempts to determine the location of one or more objects in the environment. For purposes of this example, the base station 510 attempts to determine the location of the target 530, though it could also be done by the user device 520. The base station 510 begins by determining its location and the location of the user device 520, e.g., by requesting the location from the user device 520 or by determining the user device's location, e.g., by using RTT and AoA techniques to determine a distance and heading to the user device 520.

The base station 510 then transmits a reference signal to the other device. The reference signal is any suitable signal transmitted using the available RF bandwidth that is used to help determine the location of the target 530. For example, the reference signal may be sent using a beamforming technique to direct a reference signal to the remote device. In some examples, the reference signal may transmit omnidirectionally. In such an example, while many copies of the reference signal may arrive at the user device 520, the first one to arrive may be identified as having taken the most direct path, illustrated as the idealized straight-line direct path 540 in FIG. 5.

The user device 520 then receives a reflected version of the reference signal that has encountered the target while propagating through the environment. In examples where the reference signal is transmitted using a beamforming technique, the reflected version of the reference signal may be a signal transmitted at a different time than the beamformed signal transmitted to the remote device. For example, the transmitter may direct a beam at a target object in an environment and the remote device may detect a reflection of the beam off of the target object. In some examples where the transmitter transmits the reference signal omnidirectionally, the reflected signal may have been transmitted at the same time as the signal traversing a direct path 540 from the transmitter to the remove device. In either case, the reflected signal follows the paths 542a-b shown in FIG. 5. The user device 520 then computes the ToF and the AoA, i.e., $\varphi_{(UD, Target)}$ for the reflected signal using conventional wireless signal processing techniques.

After computing these two parameters, the user device 520 then communicates them to the base station 510, which receives them and determines the location of the target. First, it determines the shape of an ellipse based on the ToF for the reflected path 542a-b as described above with respect to FIG. 4B. Because all points on an ellipse have the same combined distance to each of the two focus points, a single ellipse is defined based on the ToF. This is because the ToF represents the distance travelled by the reference signal from the base station 510 to the user device 520 as it reflected off of the target 530.

In addition, based on the AoA of the reflected signal at the user device 520, a single point on the ellipse can be identified by extending a ray outward from the user device 520 at the AoA of the reflected signal. The point at which the ray intersects the ellipse represents the location of the target 530. For example, as illustrated above with equation 5, once various properties of the ellipse are known, a point on the ellipse may be determined based on the location of a focus point and an angle from that focus point. The location on the ellipse may then be mapped to a geographical coordinate system, such as latitude and longitude, to obtain the location of the target 530.

As mentioned above, while the base station 510 initiated the positioning functionality and transmitted the reference signal, in some examples, the user device 510 may perform either or both of such functionalities. Further, while the user device 520 received the reference signal and computed the ToF and AoA parameters, such parameters may instead be determined by the base station 510. Further, either the base station 510 or the user device 520 may determine the location of the target based on the determined ToF and AoA parameters.

FIG. 6 is a flow chart of a method 600 for bi-static radio-based object location detection, according to an embodiment. This example method 600 will be discussed with respect to the example system 500 shown in FIG. 5, though it may be performed by any system according to this disclosure. For example, some or all of the operations illustrated in method 600 may be performed by a base station 120 (e.g., base station 510) or UE 105 (e.g., user device 520). Example hardware and/or software components that may be used to perform these operations by a base station 120 or UE 105 are provided in FIGS. 9 and 10, respectively, which are discussed in more detail hereafter.

The functionality at block 610 comprises obtaining, at a first wireless device, a location of a second wireless device. As noted below with regard to block 630, the first wireless device may be the transmitting device and the second wireless device may be the receiving device, or vice versa. In an example, the first wireless device may use any of the positioning techniques discussed above with respect to FIGS. 1 and 2 to obtain the location of the second wireless device. Additionally or alternatively, the method 600 may comprise requesting, by the first wireless device from the second wireless device, the location of the second wireless device, wherein obtaining the location of the second wireless device may comprises receiving the location of the second wireless device by the first wireless device from the second wireless device. For example, the second wireless device may comprise a user device that determines its own location, such as by using a suitable GNSS, such as GPS, or by using RF techniques, such as trilateration based on received wireless signals, Wi-Fi (or other WLAN) positioning, etc. However, in some examples, the first wireless device may comprise a base station 510 that may obtain the location of the second wireless device (user device 520) based on determining a RTT of a signal, such as a reference signal, transmitted by the base station 510 and a corresponding response sent by the user device 520, as well as an AoA of the response received by the base station 510. The RTT indicates the ToF from the base station 510 to the user device 520 and the ToF from the user device to the base station 510 (plus some processing time at the user device 520). Thus, the RTT gives a close approximation of the distance between the base station and the user device, e.g., (RTT/2)*c, where c is the speed of light. In addition, by determining the AoA of the user device's response, the base station 510 determines a heading to the user device 520. Thus, the base station can compute the user device's position based on the base station's position, the distance to the user device, and the heading to the user device.

While the example above contemplated the base station 510 obtaining the location of the user device 520, in some examples, the user device 520 may instead obtain the location of the base station 510. For example, the user device 520 may request the base station's location from the base station 510, or it may obtain the base station's location based on the RTT and AoA techniques discussed above, or any other suitable technique. Thus, the first wireless device and second wireless device of the method 600 each correspond to a base station 510 and user device 520, respectively, or vice versa. That is, according to some embodiments of the method 600, the first wireless device comprises a first base station and the second wireless device comprises a second base station or a wireless user device. Alternatively, according to some embodiments, the first wireless device comprises a first wireless user device and the second wireless device comprises a second wireless user device or a base station.

Further suitable means for determining a location of a second wireless device include software executed by a processor that is configured to determine RTT and AoA as discussed above. In some examples, suitable means for obtaining a location of a second wireless device include a radio transceiver and an antenna to transmit a signal to the second wireless device and to receive the response from the second wireless device indicating the location of the second wireless device, as discussed above. However, any suitable means for determining a location of a second wireless device may be employed according to this disclosure.

At block 620, the functionality comprises obtaining, at the first wireless device, a ToF and an AoA of a wireless WWAN reference signal transmitted by a transmitting device, wherein TOF and AoA are obtained from measurements of the WWAN reference signal at a receiving device after the WWAN reference signal is reflected by an object. According to some embodiments, the first wireless device may transmit a reference signal, as discussed above with respect to FIG. 5, to the second wireless device, which reflects off of the target 530. The second wireless device may then receive the reflected version of the signal and, based on determining that the received signal is a reference signal for object location detection, it may determine the ToF and AoA for the reflected version of the signal, which corresponds to the reference signal following the reflected path 542*a-b*. It should be appreciated that in some examples, the AoA of the reflected reference signal may be determined with respect to the AoA of the direct transmission path 540. That is, the AoA of the WWAN reference signal at block 620 of FIG. 6 may comprise a DAoA indicative of an angle between a reflected path of the WWAN reference signal and a direct path between the first wireless device and the second wireless device. However, in some examples, the AoA of the reflected reference signal may be determined without reference to the AoA of the direct transmission path. According to some embodiments, the first device may transmit the WWAN reference signal using a first beam and a second beam. In such embodiments, the WWAN reference signal transmitted using the first beam May travel a direct path to the second device, and the WWAN reference signal transmitted using the second beam may be reflected by the object.

In some examples, the first wireless device itself may determine the ToF and AoA to obtain those parameters. For example, a first wireless device comprising a base station 510 may, rather than transmitting a reference signal to the second wireless device (e.g., user device 520), receive a reference signal transmitted by the second wireless device. In response to receiving one or more reflected versions of the reference signal, the first wireless device may determine the ToF and AoA of the received reflected reference signal to obtain those parameters.

With this in mind, and as described in more detail below, various of the method 600 may occur. For example, according to some embodiments, the first device comprises the transmitting device and the second device comprises the receiving device, and obtaining the ToF and the AoA of the WWAN reference signal comprises receiving, at the first wireless device, signal information from the second wireless device, the signal information comprising an indication of the ToF and an indication of the AoA of the WWAN reference signal. According to some embodiments, the first device comprises the receiving device and the second device comprises the transmitting device, and obtaining the ToF and the AoA of the WWAN reference signal comprises taking measurements of the WWAN reference signal by the first device to obtain the ToF and the AoA.

Suitable means for obtaining ToF and AoA parameters of a reflected reference signal include a radio receiver and antenna. As discussed above, obtaining ToF and AoA parameters may include transmitting a signal to a remote wireless device and receiving a response including indications of the ToF and AoA parameters. In some examples, means for obtaining may include (or may be) means for determining ToF and AoA of a received wireless signal may include a radio receiver and antenna and software to determine a time-difference of arrival of the signal at different elements of the antenna, e.g., based on phase differences of signals received at antenna elements. Further, software may determine ToF based on synchronized clocks or time bases at the transmitting device and the receiving device as well as on a transmission scheme where transmission of certain signals occur at certain predetermined time within the transmission scheme. ToF may represent a measurable offset or delay from the predetermined transmit time by the receiver. However, any suitable means for obtaining a reflected ToF and an AoA of a WWAN reference signal reflected by a remote object or means for determining a reflected ToF and an AoA of a WWAN reference signal reflected by a remote object may be employed according to this disclosure.

At block 630 the functionality comprises determining, with the first wireless device, a location of the object based on the location of the second wireless device, the ToF, and the AoA, where (i) the first device comprises the transmitting device and the second device comprises the receiving device, or (ii) the first device comprises the receiving device and the second device comprises the transmitting device. In this example, the first wireless device may determine the location of the remote object based on an ellipse generated from the reflected ToF. As discussed above with respect to FIGS. 4A-4B and 5, an ellipse may be determined based on the reflected ToF and one or both of the locations of the wireless device and the remote wireless device. After generating the ellipse, the first wireless device (e.g., base station 510) may determine an intersection between a ray extending from the second wireless device's location (e.g., user device's location 520) at the AoA and the ellipse. The location of the intersection indicates the location of the remote object, e.g., target 530. In some examples, the first wireless device may employ one or more of equations 1-5 to determine the intersection between the ray and the ellipse.

In some examples, the first wireless device may employ a geographic coordinate system, e.g., when defining the ellipse. Thus, when the first wireless device first wireless device determines the location of the intersection between the ray and the ellipse, the location may be represented by a further geographic coordinate. However, in examples where the first wireless device uses a different coordinate system, e.g., where the ellipse is centered on a hypothetical origin point having coordinates (0,0), the first wireless device may then map the ellipse from the hypothetical coordinate system to another coordinate system, e.g., an absolute coordinate system such as latitude and longitude. The mapping may be performed by calculating offsets from the hypothetical coordinate system to coordinates in the other coordinate system, e.g., for the locations of the first wireless device and the second wireless device. Such offsets may then be applied to the coordinates of the intersection point between the ray and the ellipse. And while this example involved the first wireless device determining the location of the remote object, it should be appreciated that in some examples, the second wireless device may determine the location of the remote object. Suitable means for determining a location of the remote object based on the location of the remote wireless device may include software or hardware programmed to perform the functionality discussed above with respect to block 630 as well as FIGS. 4A-4B and 5 to generate an ellipse and determine an intersection between a ray extending from the remote wireless device at the AoA and the ellipse.

While the example method 600 shown in FIG. 6 was described above as being performed by a first wireless device comprising a base station 510 based on information received from a second wireless device comprising the user device 520, it should be appreciated that the base station 510 and user device 520 each may perform the functionality of the first or second wireless device of method 600. Further, it should be appreciated that in some examples, ToF and AoA information may be determined by the remote wireless device and obtained by the wireless device, or the wireless device may receive a reference signal from the remote wireless device and determine the ToF and AoA locally. Thus, there are at least four different permutations of the method 600 discussed above. First, the base station 510 comprises the first wireless device that performs the method 600 and transmits a reference signal to a user device 520 that comprises the second wireless device, which responds with ToF and AoA information. Second, the base station 510 comprises the first wireless device that performs the method 600, receives a reference signal from the user device 520 that comprises the second wireless device, and determines the ToF and AoA information and the location of the remote object. Third, the user device 520 comprises the first wireless device that performs the method and transmits a reference signal to the base station 510 comprising the second wireless device, which responds with ToF and AoA information. Fourth, the user device 520 comprises the first wireless device that performs the method 600, receives a reference signal from the base station 510 comprising the second wireless device, and determines the ToF and AoA information and the location of the remote object. These variants are illustrated and described below with respect to FIGS. 7-8.

Figure 7:
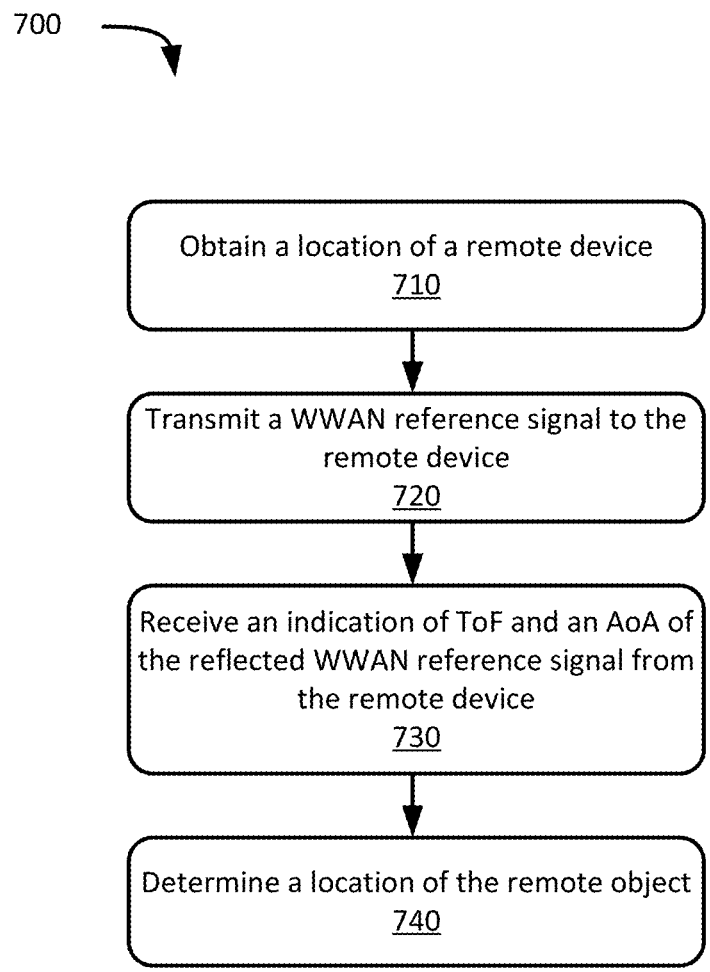

FIG. 7 is a flow diagram another example method 700 for bi-static radio-based object location detection. This example method 700 will be discussed with respect to the example system 500 shown in FIG. 5, though it may be performed by any system according to this disclosure. The method of FIG. 7 illustrates an example method where the device that determines the location of a remote object transmits a reference signal to a remote wireless device to receive signal characteristics of the reference signal as reflected from the remote object, including ToF and AoA.

At block 710, a wireless device obtains a location of a remote wireless device, generally as discussed above with respect to block 610. For example, the base station 510 may determine the location of the user device 520, or the user device 520 may determine the location of the base station 510.

At block 720, the wireless device transmits a reference signal to the remote wireless device. As discussed above, either the base station 510 or the user device 520 may transmit the reference signal. Further, any suitable reference signal may be employed. For example, an existing signal defined by a wireless specification may be employed or a distinct signal defined specifically as a reference signal for bi-static radio-based object location detection may be employed. Means for transmitting the reference signal may include a radio transmitter and antenna. Further, in some examples, the means may include software or hardware programmed to generate suitable information to be encoded onto a radio wave according to the definition of the reference signal by the corresponding specification.

At block 730, the wireless device receives an indication ToF and an AoA of the reference signal reflected by a remote object substantially as discussed above with respect to block 620.

At block 740, the wireless device determines the location of the remote object substantially as discussed above with respect to block 630.

Figure 8:
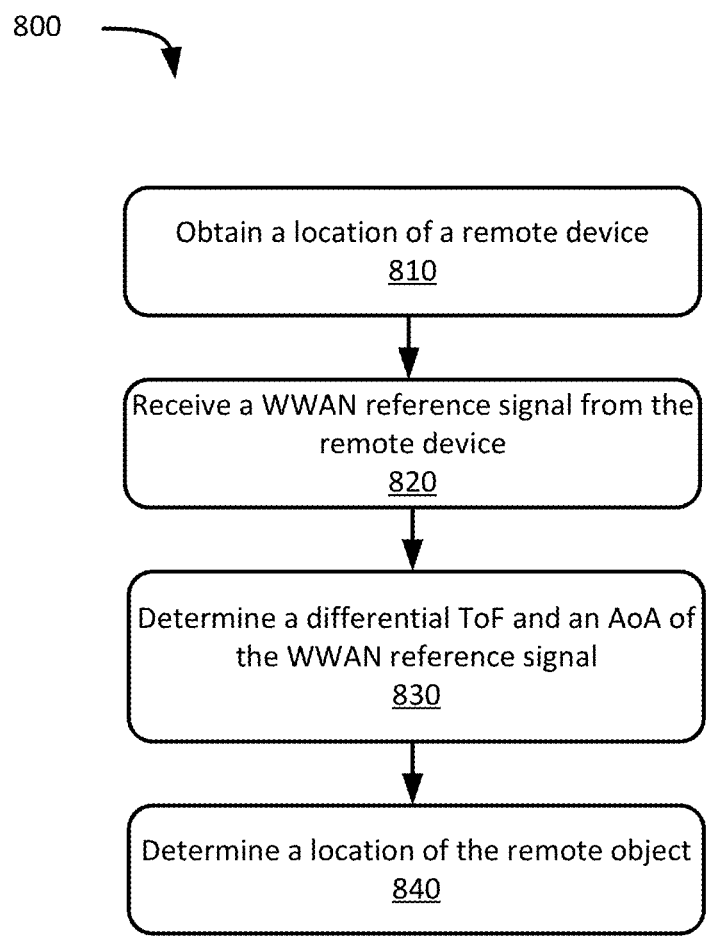

Referring now to FIG. 8, FIG. 8 shows another example method 800 for bi-static radio-based object location detection. This example method 800 will be discussed with respect to the example system 500 shown in FIG. 5, though it may be performed by any system according to this disclosure. The method of FIG. 8 illustrates an example method where the device that determines the location of a remote object receives a reference signal from a remote wireless device and determines signal characteristics of the reference signal as reflected from the remote object, including the ToF and AoA.

At block 810, a wireless device obtains a location of a remote wireless device, generally as discussed above with respect to block 610. For example, the base station 510 may determine the location of the user device 520, or the user device 520 may determine the location of the base station 510.

At block 820, the wireless device receives a reference signal from the remote wireless device. As discussed above, either the base station 510 or the user device 520 may receive the reference signal. Further, any suitable reference signal may be employed as discussed above with respect to block 520. Means for receiving the reference signal may include a radio receiver and antenna. Further, in some examples, the means may include software or hardware programmed to decode the received reference signal according to the definition of the reference signal by the corresponding specification.

At block 830, the wireless device determines the ToF and the AoA of the reference signal reflected by a remote object substantially as discussed above with respect to block 620.

At block 840, the wireless device determines the location of the remote object substantially as discussed above with respect to block 630.

Figure 9:
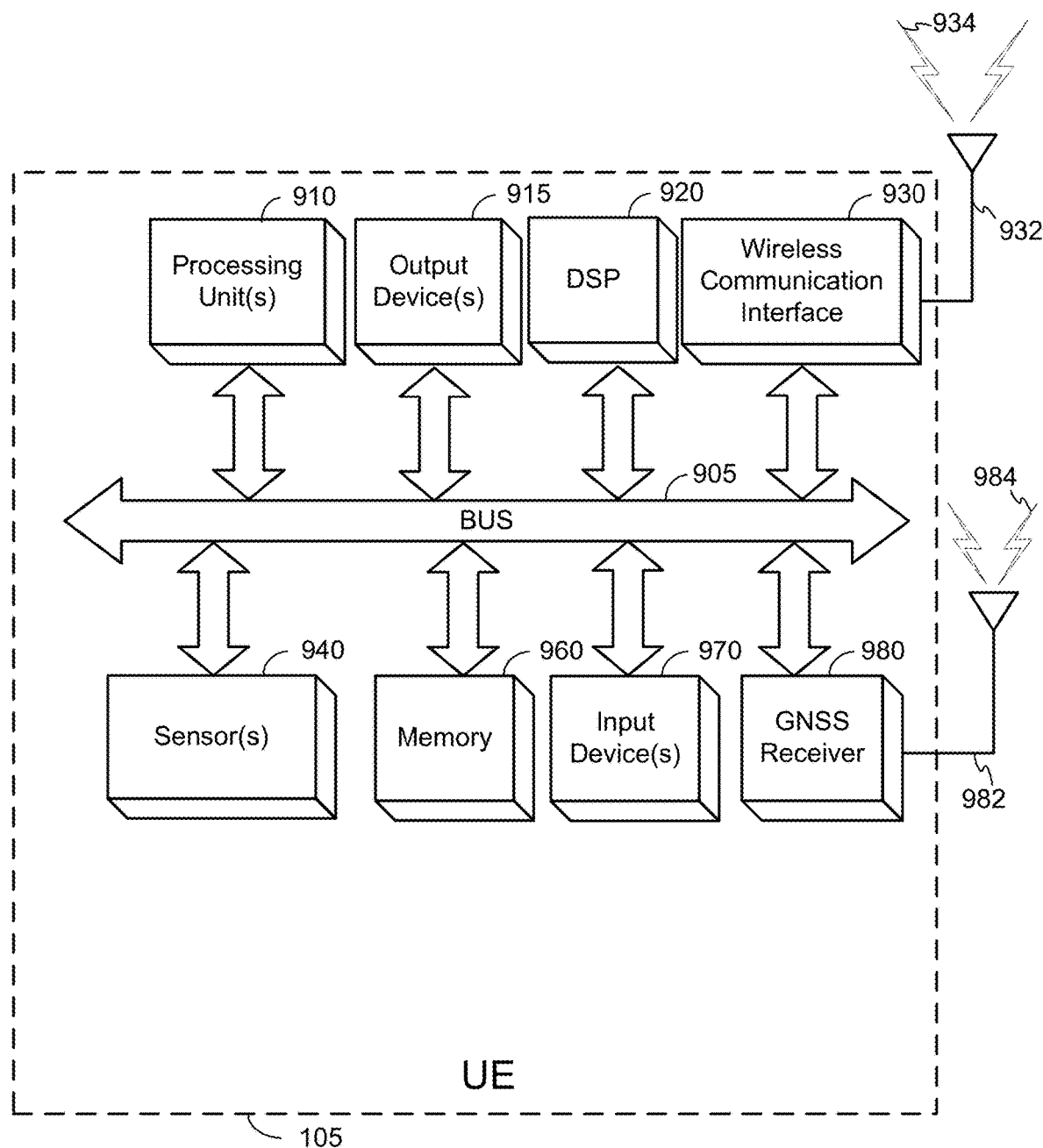
FIG. 9 shows an example mobile electronic wireless device suitable for use with example systems and methods for bi-static radio-based object location detection.

FIG. 9 illustrates an example of a UE 105, which can be utilized as described herein above (e.g., in association with FIGS. 1-8). For example, the UE 105 can perform one or more of the functions of the method shown in FIGS. 6-8. It should be noted that FIG. 9 is meant only to provide a generalized illustration of various components, any or all of which may be utilized as appropriate. It can be noted that, in some instances, components illustrated by FIG. 9 can be localized to a single physical device and/or distributed among various networked devices, which may be disposed at different physical locations. Furthermore, as previously noted, the functionality of the UE described in the previously-described examples may be executed by one or more of the hardware and/or software components illustrated in FIG. 9.

The UE 105 is shown comprising hardware elements that can be electrically coupled via a bus 905 (or may otherwise be in communication, as appropriate). The hardware elements may include a processing unit(s) 910 which can include without limitation one or more general-purpose processors, one or more special-purpose processors (such as DSP chips, graphics acceleration processors, application specific integrated circuits (ASICs), and/or the like), and/or other processing structures or means. As shown in FIG. 9, some examples may have a separate DSP 920, depending on desired functionality. Location determination and/or other determinations based on wireless communication may be provided in the processing unit(s) 910 and/or wireless communication interface 930 (discussed below). The UE 105 also can include one or more input devices 970, which can include without limitation a keyboard, touch screen, a touch pad, microphone, button(s), dial(s), switch(es), and/or the like; and one or more output devices 915, which can include without limitation a display, light emitting diode (LED), speakers, and/or the like.

The UE 105 may also include a wireless communication interface 930, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the UE 105 to communicate with other devices as described in the examples above. The wireless communication interface 930 may permit data and signaling to be communicated (e.g., transmitted and received) with a network, for example, via eNBs, gNBs, ng-eNBs, access points, various base stations and/or other access node types, TRPs, and/or other network components, computer systems, and/or any other electronic devices described herein. The communication can be carried out via one or more wireless communication antenna(s) 932 that send and/or receive wireless signals 934. According to some examples, the wireless communication antenna(s) 932 may comprise a plurality of discrete antennas, antenna arrays, or any combination thereof.

Depending on desired functionality, the wireless communication interface 930 may comprise a separate receiver and transmitter, or any combination of transceivers, transmitters, and/or receivers to communicate with base stations (e.g., ng-eNBs and gNBs) and other terrestrial transceivers, such as wireless devices and access points. The UE 105 may communicate with different data networks that may comprise various network types. For example, a Wireless Wide Area Network (WWAN) may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more RATs such as CDMA2000, WCDMA, and so on. CDMA2000 includes IS-95, IS-2000 and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from 3GPP. CDMA2000 is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The UE 105 can further include sensor(s) 940. Sensors 940 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to obtain position-related measurements and/or other information, as described herein.

Examples of the UE 105 may also include a Global Navigation Satellite System (GNSS) receiver 980 capable of receiving signals 984 from one or more GNSS satellites using an antenna 982 (which could be the same as antenna 932). Positioning based on GNSS signal measurement can be utilized to complement and/or incorporate the techniques described herein. The GNSS receiver 980 can extract a position of the UE 105, using conventional techniques, from GNSS SVs 190 of a GNSS system, such as Global Positioning System (GPS), Galileo, GLONASS, Quasi-Zenith Satellite System (QZSS) over Japan, Indian Regional Navigational Satellite System (IRNSS) over India, Beidou over China, and/or the like. Moreover, the GNSS receiver 980 can be used with various augmentation systems (e.g., a Satellite Based Augmentation System (SBAS)) that may be associated with or otherwise enabled for use with one or more global and/or regional navigation satellite systems, such as, e.g., WAAS, EGNOS, Multi-functional Satellite Augmentation System (MSAS), and Geo Augmented Navigation system (GAGAN), and/or the like.

The UE 105 may further include and/or be in communication with a memory 960. The memory 960 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 960 of the UE 105 also can comprise software elements (not shown in FIG. 9), including an operating system, device drivers, executable libraries, and/or other code, such as one or more application programs, which may comprise computer programs provided by various examples, and/or may be designed to implement methods, and/or configure systems, provided by other examples, as described herein. Merely by way of example, one or more procedures described with respect to the method(s) discussed above may be implemented as code and/or instructions in memory 960 that are executable by the UE 105 (and/or processing unit(s) 910 or DSP 920 within UE 105). In an aspect, then such code and/or instructions can be used to configure and/or adapt a general purpose computer (or other device) to perform one or more operations in accordance with the described methods.

Figure 10:
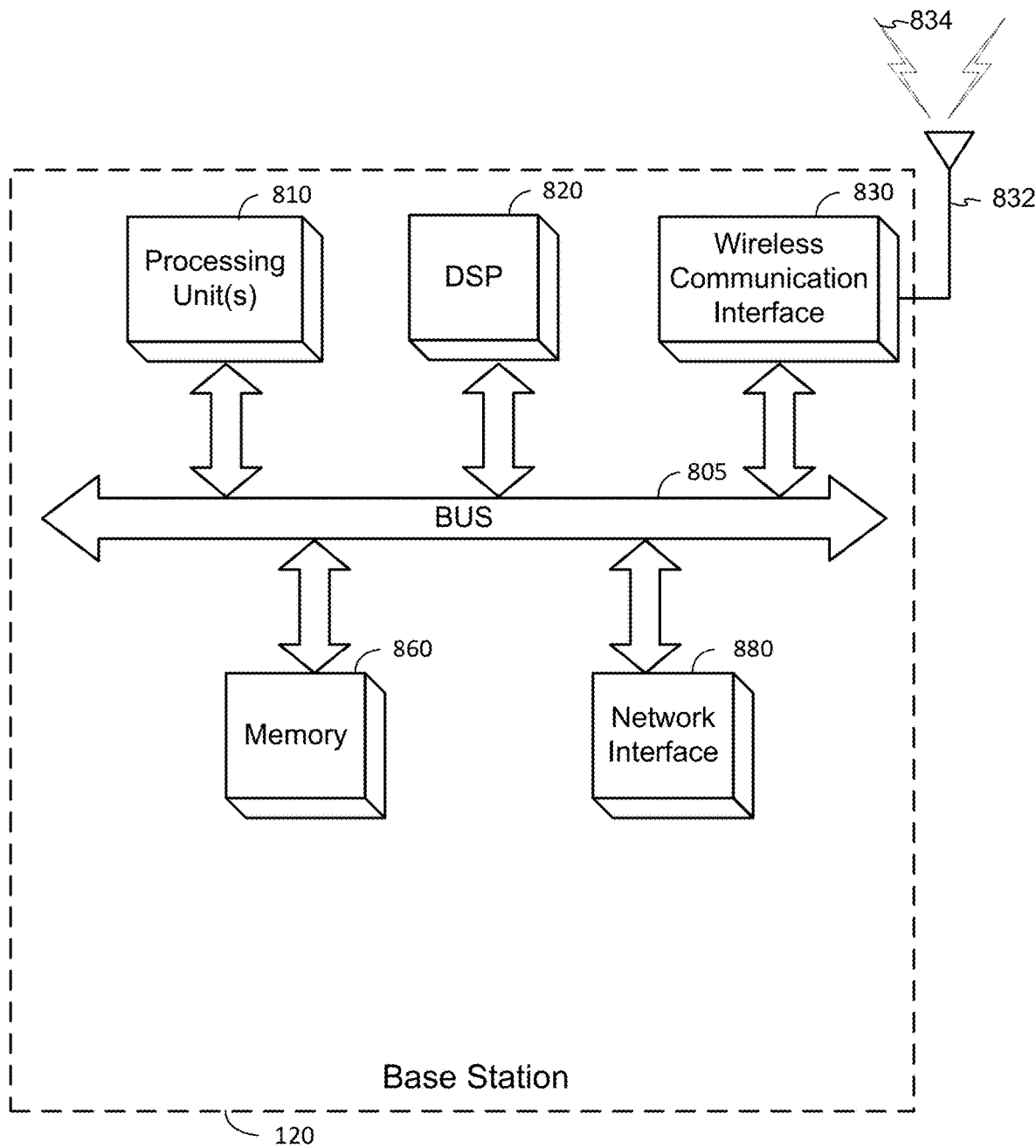
FIG. 10 shows an example base station suitable for use with example systems and methods for bi-static radio-based object location detection.

FIG. 10 illustrates an example of a base station 120, which can be utilized as described herein above (e.g., in association with FIGS. 1-8). It should be noted that FIG. 10 is meant only to provide a generalized illustration of various components, any or all of which may be utilized as appropriate. In some examples, the base station 120 may correspond to a gNB, an ng-eNB, and/or (more generally) a TRP.

The base station 120 is shown comprising hardware elements that can be electrically coupled via a bus 1005 (or may otherwise be in communication, as appropriate). The hardware elements may include a processing unit(s) 1010 which can include without limitation one or more general-purpose processors, one or more special-purpose processors (such as DSP chips, graphics acceleration processors, ASICs, and/or the like), and/or other processing structure or means. As shown in FIG. 10, some examples may have a separate DSP 1020, depending on desired functionality. Location determination and/or other determinations based on wireless communication may be provided in the processing unit(s) 1010 and/or wireless communication interface 1030 (discussed below), according to some examples. The base station 120 also can include one or more input devices, which can include without limitation a keyboard, display, mouse, microphone, button(s), dial(s), switch(es), and/or the like; and one or more output devices, which can include without limitation a display, light emitting diode (LED), speakers, and/or the like.

The base station 120 might also include a wireless communication interface 1030, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, cellular communication facilities, etc.), and/or the like, which may enable the base station 120 to communicate as described herein. The wireless communication interface 1030 may permit data and signaling to be communicated (e.g., transmitted and received) to UEs, other base stations/TRPs (e.g., eNBs, gNBs, and ng-eNBs), and/or other network components, computer systems, and/or any other electronic devices described herein. The communication can be carried out via one or more wireless communication antenna(s) 1032 that send and/or receive wireless signals 1034.

The base station 120 may also include a network interface 1080, which can include support of wireline communication technologies. The network interface 1080 may include a modem, network card, chipset, and/or the like. The network interface 1080 may include one or more input and/or output communication interfaces to permit data to be exchanged with a network, communication network servers, computer systems, and/or any other electronic devices described herein.

In many examples, the base station 120 may further comprise a memory 1060. The memory 1060 can include, without limitation, local and/or network accessible storage, a disk drive, a drive array, an optical storage device, a solid-state storage device, such as a RAM, and/or a ROM, which can be programmable, flash-updateable, and/or the like. Such storage devices may be configured to implement any appropriate data stores, including without limitation, various file systems, database structures, and/or the like.

The memory 1060 of the base station 120 also may comprise software elements (not shown in FIG. 10), including an operating system, device drivers, executable libraries, and/or other code, such as one or more application programs, which may comprise computer programs provided by various examples, and/or may be designed to implement methods, and/or configure systems, provided by other examples, as described herein. Merely by way of example, one or more procedures described with respect to the method(s) discussed above may be implemented as code and/or instructions in memory 1060 that are executable by the base station 120 (and/or processing unit(s) 1010 or DSP 1020 within base station 120). In an aspect, then such code and/or instructions can be used to configure and/or adapt a general purpose computer (or other device) to perform one or more operations in accordance with the described methods.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In examples provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, a carrier wave as described hereinafter, or any other medium from which a computer can read instructions and/or code.

The methods, systems, and devices discussed herein are examples. Various examples may omit, substitute, or add various procedures or components as appropriate. For instance, features described with respect to certain examples may be combined in various other examples. Different aspects and elements of the examples may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several examples, various modifications, alternative constructions, and equivalents may be used without departing from the spirit of the disclosure. For example, the above elements may merely be a component of a larger system, wherein other rules may take precedence over or otherwise modify the application of the various examples. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. A method for bi-static radio-based object location detection, the method comprising: obtaining, at a first wireless device, a location of a second wireless device; obtaining, at the first wireless device, a time-of-flight (ToF) and an angle of arrival (AoA) of a wireless wide-area network (WWAN) reference signal transmitted by a transmitting device, wherein TOF and AoA are obtained from measurements of the WWAN reference signal at a receiving device after the WWAN reference signal is reflected by an object; and determining, with the first wireless device, a location of the object based on the location of the second wireless device, the ToF, and the AoA; wherein: the first wireless device comprises the transmitting device and the second wireless device comprises the receiving device, or the first wireless device comprises the receiving device and the second wireless device comprises the transmitting device.

Clause 2. The method of clause 1, wherein the AoA of the WWAN reference signal comprises a differential AoA (DAoA) indicative of an angle between a reflected path of the WWAN reference signal and a direct path between the first wireless device and the second wireless device.

Clause 3. The method of any of clauses 1-2 further comprising requesting, by the first wireless device from the second wireless device, the location of the second wireless device, wherein obtaining the location of the second wireless device comprises receiving the location of the second wireless device by the first wireless device from the second wireless device.

Clause 4. The method of any of clauses 1-3 wherein the first wireless device comprises the transmitting device and the second wireless device comprises the receiving device; and obtaining the ToF and the AoA of the WWAN reference signal comprises receiving, at the first wireless device, signal information from the second wireless device, the signal information comprising an indication of the ToF and an indication of the AoA of the WWAN reference signal.

Clause 5. The method of clause 4 wherein the first wireless device transmits the WWAN reference signal using a first beam and a second beam; and wherein: the WWAN reference signal transmitted using the first beam travels a direct path to the second wireless device, and the WWAN reference signal transmitted using the second beam is reflected by the object.

Clause 6. The method of any of clauses 1-3 wherein the first wireless device comprises the receiving device and the second wireless device comprises the transmitting device; and obtaining the ToF and the AoA of the WWAN reference signal comprises taking measurements of the WWAN reference signal by the first wireless device to obtain the ToF and the AoA.

Clause 7. The method of any of clauses 1-6 wherein the first wireless device comprises a first base station and the second wireless device comprises a second base station or a wireless user device.

Clause 8. The method of any of clauses 1-6 wherein the first wireless device comprises a first wireless user device and the second wireless device comprises a second wireless user device or a base station.

Clause 9. A first wireless device for bi-static radio-based object location detection, the first wireless device comprising: a transceiver; a memory; and one or more processors communicatively coupled with the transceiver and the memory, wherein the one or more processors are configured to: obtain a location of a second wireless device; obtain a time-of-flight (ToF) and an angle of arrival (AoA) of a wireless wide-area network (WWAN) reference signal transmitted by a transmitting device, wherein TOF and AoA are obtained from measurements of the WWAN reference signal at a receiving device after the WWAN reference signal is reflected by an object; and determine a location of the object based on the location of the second wireless device, the ToF, and the AoA, wherein: the first wireless device comprises the transmitting device and the second wireless device comprises the receiving device, or the first wireless device comprises the receiving device and the second wireless device comprises the transmitting device.

Clause 10. The first wireless device of clause 9, wherein, to obtain the AoA of the WWAN reference signal, the one or more processors are configured to obtain a differential AoA (DAoA) indicative of an angle between a reflected path of the WWAN reference signal and a direct path between the first wireless device and the second wireless device.

Clause 11. The first wireless device of any of clauses 9-10 wherein the one or more processors are further configured to request, via the transceiver, the location of the second wireless device, wherein, to obtain the location of the second wireless device, the one or more processors are configured to receive the location of the second wireless device from the second wireless device via the transceiver.

Clause 12. The first wireless device of any of clauses 9-11 wherein the first wireless device comprises the transmitting device; and to obtain the ToF and the AoA of the WWAN reference signal, the one or more processors are configured to receive, via the transceiver, signal information from the second wireless device, the signal information comprising an indication of the ToF and an indication of the AoA of the WWAN reference signal.

Clause 13. The first wireless device of clause 12 wherein the one or more processors are configured to transmit, via the transceiver, the WWAN reference signal using a first beam and a second beam such that: the WWAN reference signal transmitted using the first beam travels a direct path to the second wireless device, and the WWAN reference signal transmitted using the second beam is reflected by the object.

Clause 14. The first wireless device of any of clauses 9-11 wherein the first wireless device comprises the receiving device; and to obtain the ToF and the AoA of the WWAN reference signal, the one or more processors are configured to take measurements of the WWAN reference signal, using the transceiver, to obtain the ToF and the AoA.

Clause 15. The first wireless device of any of clauses 9-14 wherein the first wireless device comprises a first base station or a wireless user device.

Clause 16. An apparatus for bi-static radio-based object location detection, the apparatus comprising: means for obtaining a location of a wireless device; means for obtaining a time-of-flight (ToF) and an angle of arrival (AoA) of a wireless wide-area network (WWAN) reference signal transmitted by a transmitting device, wherein TOF and AoA are obtained from measurements of the WWAN reference signal at a receiving device after the WWAN reference signal is reflected by an object; and means for determining a location of the object based on the location of the wireless device, the ToF, and the AoA, wherein: the apparatus comprises the transmitting device and the wireless device comprises the receiving device, or the apparatus comprises the receiving device and the wireless device comprises the transmitting device.

Clause 17. The apparatus of clause 16, wherein the means for obtaining the AoA of the WWAN reference signal comprises means for obtaining a differential AoA (DAoA) indicative of an angle between a reflected path of the WWAN reference signal and a direct path between the apparatus and the wireless device.

Clause 18. The apparatus of any of clauses 16-17 further comprising means for requesting the location of the wireless device, wherein the means for obtaining the location of the wireless device comprises means for receiving the location of the wireless device by the apparatus from the wireless device.

Clause 19. The apparatus of any of clauses 16-18 wherein the apparatus comprises the transmitting device; and the means for obtaining the ToF and the AoA of the WWAN reference signal comprises means for receiving, at the apparatus, signal information from the wireless device, the signal information comprising an indication of the ToF and an indication of the AoA of the WWAN reference signal.

Clause 20. The apparatus of clause 19 wherein the apparatus transmits the WWAN reference signal using a first beam and a second beam; and wherein: the WWAN reference signal transmitted using the first beam travels a direct path to the wireless device, and the WWAN reference signal transmitted using the second beam is reflected by the object.

Clause 21. The apparatus of any of clauses 16-18 wherein the apparatus comprises the receiving device; and the means for obtaining the ToF and the AoA of the WWAN reference signal comprises means for taking measurements of the WWAN reference signal by the apparatus to obtain the ToF and the AoA.

Clause 22. The apparatus of any of clauses 16-21 wherein the apparatus comprises a first base station or a first wireless user device.

Clause 23. A non-transitory computer-readable medium storing instructions for bi-static radio-based object location detection, the instructions comprising code for: obtaining, at a first wireless device, a location of a second wireless device; obtaining, at the first wireless device, a time-of-flight (ToF) and an angle of arrival (AoA) of a wireless wide-area network (WWAN) reference signal transmitted by a transmitting device, wherein TOF and AoA are obtained from measurements of the WWAN reference signal at a receiving device after the WWAN reference signal is reflected by an object; and determining, with the first wireless device, a location of the object based on the location of the second wireless device, the ToF, and the AoA, wherein: the first wireless device comprises the transmitting device and the second wireless device comprises the receiving device, or the first wireless device comprises the receiving device and the second wireless device comprises the transmitting device.

Clause 24. The computer-readable medium of clause 23, wherein the code for obtaining the AoA of the WWAN reference signal comprises code for obtaining a differential AoA (DAoA) indicative of an angle between a reflected path of the WWAN reference signal and a direct path between the first wireless device and the second wireless device.

Clause 25. The computer-readable medium of any of clauses 23-24 wherein the instructions further comprise code for requesting the location of the second wireless device, wherein the code for obtaining the location of the second wireless device comprises code for receiving the location of the second wireless device by the first wireless device from the second wireless device.

Clause 26. The computer-readable medium of any of clauses 23-25 wherein the code for obtaining the ToF and the AoA of the WWAN reference signal comprises code for receiving, at the first wireless device, signal information from the second wireless device, the signal information comprising an indication of the ToF and an indication of the AoA of the WWAN reference signal.

Clause 27. The computer-readable medium of clause 26 wherein the instructions comprise code for transmitting the WWAN reference signal by the first wireless device using a first beam and a second beam such that: the WWAN reference signal transmitted using the first beam travels a direct path to the second wireless device, and the WWAN reference signal transmitted using the second beam is reflected by the object.

Clause 28. The computer-readable medium of any of clauses 23-25 wherein the code for obtaining the ToF and the AoA of the WWAN reference signal comprises code for taking measurements of the WWAN reference signal by the first wireless device to obtain the ToF and the AoA.

What is claimed is:

1. A method for bi-static radio-based object location detection, the method comprising:
    obtaining, at a first wireless device, a location of a second wireless device;
    obtaining, at the first wireless device, a time-of-flight (ToF) and an angle of arrival (AoA) of a wireless wide-area network (WWAN) reference signal transmitted by a transmitting device, wherein the TOF and the AoA are obtained from measurements of the WWAN reference signal at a receiving device after the WWAN reference signal is reflected by an object; and
    determining, with the first wireless device, a location of the object based on the location of the second wireless device, the ToF, and the AoA, wherein the AoA of the WWAN reference signal comprises a differential AoA (DAoA) indicative of an angle between a reflected path of the WWAN reference signal and a direct path between the first wireless device and the second wireless device;
    wherein:
        the first wireless device comprises the transmitting device and the second wireless device comprises the receiving device, or
        the first wireless device comprises the receiving device and the second wireless device comprises the transmitting device.

2. The method of claim 1, further comprising requesting, by the first wireless device from the second wireless device, the location of the second wireless device, wherein obtaining the location of the second wireless device comprises receiving the location of the second wireless device by the first wireless device from the second wireless device.

3. The method of claim 1, wherein:
    the first wireless device comprises the transmitting device and the second wireless device comprises the receiving device; and
    obtaining the ToF and the AoA of the WWAN reference signal comprises receiving, at the first wireless device, signal information from the second wireless device, the signal information comprising an indication of the ToF and an indication of the AoA of the WWAN reference signal.

4. The method of claim 3, wherein the first wireless device transmits the WWAN reference signal using a first beam and a second beam; and wherein:
    the WWAN reference signal transmitted using the first beam travels a direct path to the second wireless device, and
    the WWAN reference signal transmitted using the second beam is reflected by the object.

5. The method of claim 1, wherein:
    the first wireless device comprises the receiving device and the second wireless device comprises the transmitting device; and
    obtaining the ToF and the AoA of the WWAN reference signal comprises taking measurements of the WWAN reference signal by the first wireless device to obtain the ToF and the AoA.

6. The method of claim 1, wherein the first wireless device comprises a first base station and the second wireless device comprises a second base station or a wireless user device.

7. The method of claim 1, wherein the first wireless device comprises a first wireless user device and the second wireless device comprises a second wireless user device or a base station.

8. A first wireless device for bi-static radio-based object location detection, the first wireless device comprising:
    a transceiver;
    a memory; and
    one or more processors communicatively coupled with the transceiver and the memory, wherein the one or more processors are configured to:
        obtain a location of a second wireless device;
        obtain a time-of-flight (ToF) and an angle of arrival (AoA) of a wireless wide-area network (WWAN) reference signal transmitted by a transmitting device, wherein the TOF and the AoA are obtained from measurements of the WWAN reference signal at a receiving device after the WWAN reference signal is reflected by an object, further wherein obtaining the AoA of the WWAN reference signal includes configuring the one or more processors to obtain a differential AoA (DAoA) indicative of an angle between a reflected path of the WWAN reference signal and a direct path between the first wireless device and the second wireless device; and
        determine a location of the object based on the location of the second wireless device, the ToF, and the AoA, wherein:
            the first wireless device comprises the transmitting device and the second wireless device comprises the receiving device, or
            the first wireless device comprises the receiving device and the second wireless device comprises the transmitting device.

9. The first wireless device of claim 8, wherein the one or more processors are further configured to request, via the transceiver, the location of the second wireless device, wherein, to obtain the location of the second wireless device, the one or more processors are configured to receive the location of the second wireless device from the second wireless device via the transceiver.

10. The first wireless device of claim 8, wherein:
the first wireless device comprises the transmitting device; and
to obtain the ToF and the AoA of the WWAN reference signal, the one or more processors are configured to receive, via the transceiver, signal information from the second wireless device, the signal information comprising an indication of the ToF and an indication of the AoA of the WWAN reference signal.

11. The first wireless device of claim 10, wherein the one or more processors are configured to transmit, via the transceiver, the WWAN reference signal using a first beam and a second beam such that:
the WWAN reference signal transmitted using the first beam travels a direct path to the second wireless device, and
the WWAN reference signal transmitted using the second beam is reflected by the object.

12. The first wireless device of claim 8, wherein:
the first wireless device comprises the receiving device; and
to obtain the ToF and the AoA of the WWAN reference signal, the one or more processors are configured to take measurements of the WWAN reference signal, using the transceiver, to obtain the ToF and the AoA.

13. The first wireless device of claim 8, wherein the first wireless device comprises a first base station or a wireless user device.

14. An apparatus for bi-static radio-based object location detection, the apparatus comprising:
means for obtaining a location of a wireless device;
means for obtaining a time-of-flight (ToF) and an angle of arrival (AoA) of a wireless wide-area network (WWAN) reference signal transmitted by a transmitting device, wherein the TOF and the AoA are obtained from measurements of the WWAN reference signal at a receiving device after the WWAN reference signal is reflected by an object wherein the means for obtaining the AoA of the WWAN reference signal comprises means for obtaining a differential AoA (DAoA) indicative of an angle between a reflected path of the WWAN reference signal and a direct path between the apparatus and the wireless device; and
means for determining a location of the object based on the location of the wireless device, the ToF, and the AoA, wherein:
the apparatus comprises the transmitting device and the wireless device comprises the receiving device, or
the apparatus comprises the receiving device and the wireless device comprises the transmitting device.

15. The apparatus of claim 14, further comprising means for requesting the location of the wireless device, wherein the means for obtaining the location of the wireless device comprises means for receiving the location of the wireless device by the apparatus from the wireless device.

16. The apparatus of claim 14, wherein:
the apparatus comprises the transmitting device; and
the means for obtaining the ToF and the AoA of the WWAN reference signal comprises means for receiving, at the apparatus, signal information from the wireless device, the signal information comprising an indication of the ToF and an indication of the AoA of the WWAN reference signal.

17. The apparatus of claim 16, wherein the apparatus transmits the WWAN reference signal using a first beam and a second beam; and wherein:
the WWAN reference signal transmitted using the first beam travels a direct path to the wireless device, and
the WWAN reference signal transmitted using the second beam is reflected by the object.

18. The apparatus of claim 14, wherein:
the apparatus comprises the receiving device; and
the means for obtaining the ToF and the AoA of the WWAN reference signal comprises means for taking measurements of the WWAN reference signal by the apparatus to obtain the ToF and the AoA.

19. The apparatus of claim 14, wherein the apparatus comprises a first base station or a first wireless user device.

20. A non-transitory computer-readable medium storing instructions for bi-static radio-based object location detection, the instructions comprising code for:
obtaining, at a first wireless device, a location of a second wireless device;
obtaining, at the first wireless device, a time-of-flight (ToF) and an angle of arrival (AoA) of a wireless wide-area network (WWAN) reference signal transmitted by a transmitting device, wherein the TOF and the AoA are obtained from measurements of the WWAN reference signal at a receiving device after the WWAN reference signal is reflected by an object, wherein the code for obtaining the AoA of the WWAN reference signal comprises code for obtaining a differential AoA (DAoA) indicative of an angle between a reflected path of the WWAN reference signal and a direct path between the first wireless device and the second wireless device; and
determining, with the first wireless device, a location of the object based on the location of the second wireless device, the ToF, and the AoA, wherein:
the first wireless device comprises the transmitting device and the second wireless device comprises the receiving device, or
the first wireless device comprises the receiving device and the second wireless device comprises the transmitting device.

21. The computer-readable medium of claim 20, wherein the instructions further comprise code for requesting the location of the second wireless device, wherein the code for obtaining the location of the second wireless device comprises code for receiving the location of the second wireless device by the first wireless device from the second wireless device.

22. The computer-readable medium of claim 20, wherein the code for obtaining the ToF and the AoA of the WWAN reference signal comprises code for receiving, at the first wireless device, signal information from the second wireless device, the signal information comprising an indication of the ToF and an indication of the AoA of the WWAN reference signal.

23. The computer-readable medium of claim 22, wherein the instructions comprise code for transmitting the WWAN reference signal by the first wireless device using a first beam and a second beam such that:
the WWAN reference signal transmitted using the first beam travels a direct path to the second wireless device, and the WWAN reference signal transmitted using the second beam is reflected by the object.

24. The computer-readable medium of claim 20, wherein the code for obtaining the ToF and the AoA of the WWAN reference signal comprises code for taking measurements of the WWAN reference signal by the first wireless device to obtain the ToF and the AoA.

25. A method for bi-static radio-based object location detection, the method comprising:
- requesting a location of a second wireless device from a first wireless device;
- receiving the location of the second wireless device, at the first wireless device, from the second wireless device;
- obtaining, at the first wireless device, a time-of-flight (ToF) and an angle of arrival (AoA) of a wireless wide-area network (WWAN) reference signal transmitted by a transmitting device, wherein the TOF and the AoA are obtained from measurements of the WWAN reference signal at a receiving device after the WWAN reference signal is reflected by an object; and
- determining, with the first wireless device, a location of the object based on the location of the second wireless device, the ToF, and the AoA;

wherein:
- the first wireless device comprises the transmitting device and the second wireless device comprises the receiving device, or
- the first wireless device comprises the receiving device and the second wireless device comprises the transmitting device.

26. The method of claim 25, wherein the AoA of the WWAN reference signal comprises a differential AoA (DAoA) indicative of an angle between a reflected path of the WWAN reference signal and a direct path between the first wireless device and the second wireless device.

* * * * *